United States Patent
Kosiba et al.

[11] Patent Number: 6,098,052
[45] Date of Patent: Aug. 1, 2000

[54] CREDIT CARD COLLECTION STRATEGY MODEL

[75] Inventors: Eric Kosiba, Quincy, Mass.; Scott Smallwood, McLean, Va.

[73] Assignee: First USA Bank, N.A., Wilmington, Del.

[21] Appl. No.: 09/021,574

[22] Filed: Feb. 10, 1998

[51] Int. Cl.[7] .................................................. G06F 17/00
[52] U.S. Cl. ................................ 705/40; 705/1; 705/30; 705/34; 705/35; 705/38; 705/40; 235/379
[58] Field of Search ........................... 705/1, 30, 34, 705/35, 38, 40; 235/379

[56] References Cited

U.S. PATENT DOCUMENTS

| | | | |
|---|---|---|---|
| 4,633,397 | 12/1986 | Macco | 705/30 |
| 4,774,664 | 9/1988 | Campbell et al. | 705/38 |
| 4,908,761 | 3/1990 | Tai | 364/401 |
| 5,111,395 | 5/1992 | Smith et al. | 364/84 |
| 5,227,874 | 7/1993 | Von Kahorn | 358/84 |
| 5,262,941 | 11/1993 | Saladin | 358/84 |
| 5,383,113 | 1/1995 | Kight et al. | 364/401 |
| 5,550,734 | 8/1996 | Tarter et al. | 364/401 R |
| 5,583,778 | 12/1996 | Wind | 364/464.01 |
| 5,592,590 | 1/1997 | Jolly | 395/75 |
| 5,696,907 | 12/1997 | Tom | 395/238 |

OTHER PUBLICATIONS

Managing Consumer Credit Delinquency in the US Economy: A Multi–Billion Dollar Management Science Application, William M. Makuch, *Interfaces*, Jan.–Feb. 1992, pp. 91–109.

*Primary Examiner*—Thomas R. Peeso
*Attorney, Agent, or Firm*—Hunton & Williams

[57] ABSTRACT

The present invention is a computerized collection strategy model for use in collecting payments from delinquent accounts. The computerized collection strategy model estimates for each possible collection strategy, how much will be paid on each account in response to that collection strategy, estimates the amount of resources to be expended in the execution of that collection strategy, and recommends a particular collection strategy for each account that optimizes the use of the available collection resources.

25 Claims, 19 Drawing Sheets

| STRATEGY TIERS AND ATTRIBUTES | | |
|---|---|---|
| TIER 1 ATTRIBUTES | TIER 2 ATTRIBUTES | TIER 3 ATTRIBUTES |
| NUMBER OF PHONE CONTACTS | ONGOING COLLECTOR RELATIONSHIP | FEMALE COLLECTOR CONTACT |
| NUMBER OF MESSAGES PER WEEK | ATTENTION GRABBING MAILING | MALE COLLECTOR CONTACT |
| NUMBER OF MAILINGS | COLLECTION AGENCY INVOLVEMENT | CONTACT WITHIN 10 DAYS OF CYCLE DATE |
| PATTERN OF INTENSITY | LEGAL AGENCY INVOLVEMENT | WHEN CONTACTED DURING MONTH |
| DO NOTHING VS. SOMETHING | OFFER SETTLEMENT | PHONE CONTACT ON WEEKEND |
| | DEBT COUNSELING | PHONE CONTACT ON WEEKDAY |
| | CHARGING PRIVILEGES CONTENT | QUICKER PAYMENT METHOD |

FIG. 3

| PREDICTOR | DESCRIPTION | VALUE RANGE |
|---|---|---|
| A2PHONE | AVERAGE # OF PHONE CONTACTS PER MONTH DURING PAST 2 MONTHS WHEN CM WAS DELINQUENT | CONTINUOUS |
| A6PHMSML | AVERAGE # OF PHONE CONTACTS+MAILINGS+LEFT MESSAGES PER MONTH DURING PAST 6 MONTHS WHEN CM WAS DELINQUENT | CONTINUOUS |
| AMTDUE | CURRENT AMOUNT DUE | CONTINUOUS |
| BSCORE | CURRENT BEHAVIOR SCORE | CONTINUOUS |
| BSCOREDF | CHANGE IN BEHAVIOR SCORE SINCE START OF DELINQUENCY | CONTINUOUS |
| DELPHASE | DELINQUENCY CYCLE AT BEGINNING OF STRATEGY WINDOW (0= 30 DAYS, 1= 31-59 DAYS) | CONTINUOUS (0 THROUGH 7) |
| DELQ2YRS | # TIMES WENT THROUGH CYCLE IN DELINQUENT CONDITION OVER PAST 2 YEARS PLUS YTD | CONTINUOUS |
| LCNTDAYS | NUMBER OF DAYS SINCE LAST PHONE CONTACT IN DELINQUENCY INCIDENT. IF NONE, THEN DAYS SINCE START OF DELINQUENCY INCIDENT | CONTINUOUS |
| LPAYDAYS | NUMBER OF DAYS SINCE MOST RECENT PAYMENT (MAX AT 365) | CONTINUOUS |
| NPAYDEL | # OF NON-NSF PAYMENTS IN DELINQUENCY INCIDENT PRIOR TO STRATEGY WINDOW | CONTINUOUS |
| NPROMISE | # OF PROMISES IN PAST 12 MONTHS | CONTINUOUS |
| NPRVDELS | # OF PREVIOUS DELINQUENCIES | CONTINUOUS |
| PRVMAXC | MAXIMUM CYCLE REACHED IN PREVIOUS DELINQUENCY INCIDENTS | 1 = MAXIMUM CYCLE <= 1<br>2 = MAXIMUM CYCLE = 2<br>3 = MAXIMUM CYCLE >= 3 |
| UTILZTN | CURRENT LINE UTILIZATION | CONTINUOUS |

FIG. 4

|  | SRC #1 | SRC #2 |
|---|---|---|
| STRATEGY RESPONSE CHARACTERISTICS (34) | HIGH COLLECTIBILITY<br><br>RESPONDS SIMILARLY TO ALL PHONE STRATEGIES | LOW COLLECTIBILITY<br><br>RESPONDS VERY WELL TO INTENSE PHONE STRATEGIES |
| ASSIGNMENT ATTRIBUTES | 3-4 CYCLES DELINQUENT<br><br>HAS MADE A PAYMENT IN THE LAST 30 DAYS<br><br>HAS HAD MANY PHONE CONTACTS IN THE LAST 2 MONTHS | 3-4 CYCLES DELINQUENT<br><br>HAS NOT HAD MANY PHONE CONTACTS IN THE LAST 2 MONTHS<br><br>HAS NOT HAD MANY PHONE CONTACTS, MESSAGES, OR MAILINGS IN THE LAST 6 MONTHS |

FIG. 5

| DELINQUENCY PHASE | NUMBER OF SRCS | PREDICTORS (58) USED TO DETERMINE SRC MEMBERSHIP |
|---|---|---|
| 0 | 5 | BEHAVIOR SCORE (BSCORE)<br>UTILIZATION (UTILZTN)<br>AMOUNT DUE (AMTDUE) |
| 1 | 5 | BEHAVIOR SCORE (BSCORE)<br>UTILIZATION (UTILZTN)<br>AVERAGE NUMBER OF PHONE CONTACTS, MESSAGES, AND MAILINGS PER DELINQUENT MONTH OVER THE PAST 6 MONTHS (A6PHMSML) |
| 2 | 5 | NUMBER OF PREVIOUS DELINQUENCIES (NPRVDELS)<br>AVERAGE NUMBER OF PHONE CONTACTS PER DELINQUENT MONTH OVER THE PAST 2 MONTHS (A2PHONE)<br>AVERAGE NUMBER OF PHONE CONTACTS, MESSAGES, AND MAILINGS PER DELINQUENT MONTH OVER THE PAST 6 MONTHS (A6PHMSML) |
| 3/4 | 6 | NUMBER OF DAYS SINCE THE LAST PAYMENT (LPAYDAYS)<br>AVERAGE NUMBER OF PHONE CONTACTS PER DELINQUENT MONTH OVER THE PAST 2 MONTHS (A2PHONE)<br>AVERAGE NUMBER OF PHONE CONTACTS, MESSAGES, AND MAILINGS PER DELINQUENT MONTH OVER THE PAST 6 MONTHS (A6PHMSML)<br>NUMBER OF PREVIOUS DELINQUENCIES (NPRVDELS) |
| 5/6 | 5 | NUMBER OF DAYS SINCE THE LAST PAYMENT (LPAYDAYS)<br>AVERAGE NUMBER OF PHONE CONTACTS PER DELINQUENT MONTH OVER THE PAST 2 MONTHS (A2PHONE)<br>AMOUNT DUE (AMTDUE)<br>NUMBER OF MONTHS CYCLED DELINQUENT IN PAST 2 YEARS (DELQ2YRS) |
| 7 | 3 | NUMBER OF DAYS SINCE THE LAST PAYMENT (LPAYDAYS)<br>AVERAGE NUMBER OF PHONE CONTACTS PER DELINQUENT MONTH OVER THE PAST 2 MONTHS (A2PHONE) |

FIG. 6

| DROP DAY (n) | BSCORE<650 | 650<=BSCORE<710 | BSCORE>=710 |
|---|---|---|---|
| 30-34 | 0.05 | 0.10 | 0.20 |
| 35-39 | 0.23 | 0.40 | 0.60 |
| 40-44 | 0.30 | 0.45 | 0.70 |
| 45-49 | 0.40 | 0.55 | 0.75 |
| 50-54 | 0.45 | 0.61 | 0.77 |
| 55-59 | 0.50 | 0.65 | 0.80 |

FIG. 7

| SRC NUMBER | ASSIGNMENT RULES | RELATIVE COLLECTABILITY | RESPONSE TO COLLECTIONS STRATEGIES (COMPARED TO OTHER SRCS IN SAME DELPHASE)* | ACCOUNT CHARACTERISTICS (COMPARED TO OTHER SRCS IN SAME DELPHASE) |
|---|---|---|---|---|
| 1 | DELPHASE = 0<br>BSCORE < 625<br>UTILZTN < 101 | 0.72 | | MOST LIKELY TO HAVE BEEN DELINQUENT RECENTLY<br>MORE LIKELY TO BE GOLD OR SELECT |
| 2 | DELPHASE = 0<br>BSCORE < 625<br>UTILZTN >= 101 | 0.52 | | MORE LIKELY TO HAVE BEEN DELINQUENT RECENTLY<br>LOWEST CREDIT LINES<br>LESS LIKELY TO BE GOLD OR SELECT<br>HIGHEST % OF CASH TRANSACTIONS |
| 3 | DELPHASE = 0<br>BSCORE >= 625<br>AMTDUE < 30 | 0.93 | | LESS LIKELY TO BE GOLD OR SELECT<br>LOWER % OF CASH TRANSACTIONS |
| 4 | DELPHASE = 0<br>BSCORE >= 625<br>AMTDUE >= 30<br>UTILZTN < 90 | 0.88 | | HIGHEST CREDIT LINES<br>MOST LIKELY TO BE GOLD OR SELECT<br>LOWEST % OF CASH TRANSACTIONS |
| 5 | DELPHASE = 0<br>BSCORE >= 625<br>AMTDUE >= 30<br>UTILZTN >= 90 | 0.78 | | LEAST LIKELY TO HAVE BEEN DELINQUENT RECENTLY |

*NO STRATEGY RESPONSE DIFFERENTIATION IN DELINQUENCY PHASE 0

FIG. 14

| SRC NUMBER | ASSIGNMENT RULES | RELATIVE COLLECTABILITY | RESPONSE TO COLLECTIONS STRATEGIES (COMPARED TO OTHER SRCS IN SAME DELPHASE) | ACCOUNT CHARACTERISTICS (COMPARED TO OTHER SRCS IN SAME DELPHASE) |
|---|---|---|---|---|
| 6 | DELPHASE = 1<br>BSCORE < 650<br>UTILZTN < 101<br>A6PHMSML < 1 | 0.57 | | MORE LIKELY TO HAVE BEEN DELINQUENT RECENTLY<br>HIGHEST CASH BALANCES<br>MORE LIKELY TO BE NEW ACCOUNTS<br>HIGHER % OF CASH TRANSACTIONS |
| 7 | DELPHASE = 1<br>BSCORE < 650<br>UTILZTN < 101<br>A6PHMSML >= 1 | 0.46 | | MOST LIKELY TO HAVE BEEN DELINQUENT RECENTLY<br>HIGHER CASH BALANCES<br>LESS LIKELY TO BE NEW ACCOUNTS |
| 8 | DELPHASE = 1<br>BSCORE < 650<br>UTILZTN >= 101 | 0.38 | | MORE LIKELY TO HAVE BEEN DELINQUENT RECENTLY<br>HIGHER CASH BALANCES<br>MORE LIKELY TO BE NEW ACCOUNTS<br>HIGHEST % OF CASH TRANSACTIONS |
| 9 | DELPHASE = 1<br>BSCORE >= 650<br>A6PHMSML < 0.5 | 0.70 | LESS LIKELY TO RESPOND TO INTENSE STRATEGIES THAN SRC #10 | LESS LIKELY TO HAVE BEEN DELINQUENT RECENTLY<br>LOWER CASH BALANCES<br>MORE LIKELY TO BE NEW ACCOUNTS<br>LOWER % OF CASH TRANSACTIONS |
| 10 | DELPHASE = 1<br>BSCORE >= 650<br>A6PHMSML >= 0.5 | 0.68 | MORE LIKELY TO RESPOND TO INTENSE STRATEGIES THAN SRC #9 | LESS LIKELY TO HAVE BEEN DELINQUENT RECENTLY<br>LOWER CASH BALANCES<br>LESS LIKELY TO BE NEW ACCOUNTS<br>LOWEST % OF CASH TRANSACTIONS |

FIG. 15

| SRC NUMBER | ASSIGNMENT RULES | RELATIVE COLLECTABILITY | RESPONSE TO COLLECTIONS STRATEGIES (COMPARED TO OTHER SRCS IN SAME DELPHASE) | ACCOUNT CHARACTERISTICS (COMPARED TO OTHER SRCS IN SAME DELPHASE) |
|---|---|---|---|---|
| 11 | DELPHASE = 2<br>NPRVDELS < 5<br>A2PHONE < 0.8<br>A6PHMSML < 2 | 0.20 | MORE LIKELY TO RESPOND TO INTENSE STRATEGIES | LEAST LIKELY TO HAVE BROKEN A PROMISE<br>MOST LIKELY TO BE IN THE DECEASED QUEUE |
| 12 | DELPHASE = 2<br>NPRVDELS < 5<br>A2PHONE < 0.8<br>A6PHMSML >= 2 | 0.14 | MORE LIKELY TO RESPOND TO INTENSE STRATEGIES | MORE LIKELY TO BE IN THE DECEASED QUEUE |
| 13 | DELPHASE = 2<br>NPRVDELS < 5<br>A2PHONE >= 0.8 | 0.19 | | MORE LIKELY TO HAVE BROKEN A PROMISE<br>LESS LIKELY TO BE IN THE DECEASED QUEUE |
| 14 | DELPHASE = 2<br>NPRVDELS >= 5<br>A2PHONE < 0.8 | 0.29 | MORE LIKELY TO RESPOND TO INTENSE STRATEGIES | SOMEWHAT MORE LIKELY TO BE IN THE DECEASED QUEUE |
| 15 | DELPHASE = 2<br>NPRVDELS >= 5<br>A2PHONE >= 0.8 | 0.32 | | MOST LIKELY TO HAVE BROKEN A PROMISE<br>LEAST LIKELY TO BE IN THE DECEASED QUEUE |

FIG. 16

| SRC NUMBER | ASSIGNMENT RULES | RELATIVE COLLECTABILITY | RESPONSE TO COLLECTIONS STRATEGIES (COMPARED TO OTHER SRCS IN SAME DELPHASE) | ACCOUNT CHARACTERISTICS (COMPARED TO OTHER SRCS IN SAME DELPHASE) |
|---|---|---|---|---|
| 16 | DELPHASE = 3/4<br>LPAYDAYS < 30<br>A2PHONE < 1.5 | 0.32 | MUCH MORE LIKELY TO RESPOND TO INTENSE STRATEGIES | MORE LIKELY TO HAVE BEEN DELINQUENT IN THE PAST 2 YEARS<br>LESS LIKELY TO BE NEW ACCOUNTS |
| 17 | DELPHASE = 3/4<br>LPAYDAYS < 30<br>A2PHONE >= 1.5 | 0.34 | INTENSITY OF STRATEGY DOES NOT MATTER MUCH | MORE LIKELY TO HAVE BEEN DELINQUENT IN THE PAST 2 YEARS<br>LESS LIKELY TO BE NEW ACCOUNTS<br>LEAST LIKELY TO BE IN SKIP QUEUE |
| 18 | DELPHASE = 3/4<br>LPAYDAYS >= 30<br>A2PHONE < 0.5<br>A6PHMSML < 2 | 0.08 | MORE LIKELY TO RESPOND TO INTENSE STRATEGIES | MOST LIKELY TO BE IN SKIP QUEUE |
| 19 | DELPHASE = 3/4<br>LPAYDAYS >= 30<br>A2PHONE < 0.5<br>A6PHMSML >= 2 | 0.05 | MORE LIKELY TO RESPOND TO INTENSE STRATEGIES | MORE LIKELY TO BE IN SKIP QUEUE |
| 20 | DELPHASE = 3/4<br>LPAYDAYS >= 30<br>A2PHONE >= 0.5<br>NPRVDELS < 2 | 0.07 | INTENSITY OF STRATEGY DOES NOT MATTER MUCH | LESS LIKELY TO HAVE BEEN DELINQUENT IN THE PAST 2 YEARS<br>MOST LIKELY TO BE NEW ACCOUNTS |
| 21 | DELPHASE = 3/4<br>LPAYDAYS >= 30<br>A2PHONE >= 0.5<br>NPRVDELS >= 2 | 0.11 | SOMEWHAT MORE LIKELY TO RESPOND TO INTENSE STRATEGIES | MORE LIKELY TO HAVE BEEN DELINQUENT IN THE PAST 2 YEARS<br>LEAST LIKELY TO BE NEW ACCOUNTS<br>LESS LIKELY TO BE IN SKIP QUEUE |

FIG. 17

| SRC NUMBER | ASSIGNMENT RULES | RELATIVE COLLECTABILITY | RESPONSE TO COLLECTIONS STRATEGIES (COMPARED TO OTHER SRCS IN SAME DELPHASE) | ACCOUNT CHARACTERISTICS (COMPARED TO OTHER SRCS IN SAME DELPHASE) |
|---|---|---|---|---|
| 22 | DELPHASE = 5/6<br>LPAYDAYS < 30 | 0.29 | MORE LIKELY TO RESPOND TO ANY STRATEGY, ESPECIALLY THOSE WITH AT LEAST 1 PHONE CONTACT | NOT LIKELY TO BE IN SKIP QUEUE<br>LOWER NUMBER OF RECENTLY DECLINED TRANSACTIONS |
| 23 | DELPHASE = 5/6<br>LPAYDAYS >= 30<br>A2PHONE < 0.5<br>AMTDUE < 250 | 0.05 | MUCH MORE LIKELY TO RESPOND TO INTENSE STRATEGIES | MORE LIKELY TO BE IN SKIP QUEUE<br>LOWEST CASH BALANCES |
| 24 | DELPHASE = 5/6<br>LPAYDAYS >= 30<br>A2PHONE < 0.5<br>AMTDUE >= 250 | 0.03 | MORE LIKELY TO RESPOND TO INTENSE STRATEGIES | HIGHEST CASH BALANCES<br>MOST LIKELY TO BE IN SKIP QUEUE<br>HIGHER NUMBER OF RECENTLY DECLINED TRANSACTIONS |
| 25 | DELPHASE = 5/6<br>LPAYDAYS >= 30<br>A2PHONE >= 0.5<br>DELQ2YRS < 10 | 0.05 | INTENSITY OF STRATEGY DOES NOT MATTER MUCH | LESS LIKELY TO BE IN SKIP QUEUE<br>HIGHEST NUMBER OF RECENTLY DECLINED TRANSACTIONS |
| 26 | DELPHASE = 5/6<br>LPAYDAYS >= 30<br>A2PHONE >= 0.5<br>DELQ2YRS >= 10 | 0.11 | SOMEWHAT MORE LIKELY TO RESPOND TO INTENSE STRATEGIES | LOWER CASH BALANCES<br>LEAST LIKELY TO BE IN SKIP QUEUE<br>LOWEST NUMBER OF RECENTLY DECLINED TRANSACTIONS |

FIG. 18

| SRC NUMBER | ASSIGNMENT RULES | RELATIVE COLLECTABILITY | RESPONSE TO COLLECTIONS STRATEGIES (COMPARED TO OTHER SRCS IN SAME DELPHASE) | ACCOUNT CHARACTERISTICS (COMPARED TO OTHER SRCS IN SAME DELPHASE) |
|---|---|---|---|---|
| 27 | DELPHASE = 7 LPAYDAYS < 30 | 0.46 | MORE LIKELY TO RESPOND TO ANY STRATEGY, ESPECIALLY THOSE WITH AT LEAST 1 PHONE CONTACT | NOT LIKELY TO BE IN SKIP QUEUE |
| 28 | DELPHASE = 7 LPAYDAYS >= 30 A2PHONE < 0.5 | 0.01 | SOMEWHAT MORE LIKELY TO RESPOND TO INTENSE STRATEGIES | MOST LIKELY TO BE IN SKIP QUEUE |
| 29 | DELPHASE = 7 LPAYDAYS >= 30 A2PHONE >= 0.5 | 0.02 | INTENSITY OF STRATEGY DOES NOT MATTER MUCH | NOT LIKELY TO BE IN SKIP QUEUE |

FIG. 19

CREDIT CARD COLLECTION STRATEGY MODEL

The present invention relates to collection strategy models for use in the credit card industry for collecting payments from delinquent accounts. In particular, the invention relates to computer models that compute an estimate, for each possible collection strategy, as to how much will be paid on each account in response to that collection strategy, computes an estimate as for the amount of resources to be expended in the execution of that collection strategy, and computes a recommendation for a particular collection strategy for each account that optimizes the use of the available collection resources.

BACKGROUND OF THE INVENTION

The credit card industry is changing rapidly. As the number of outstanding credit cards and the associated risk increase, banks, credit unions, financial institutions and other credit card issuers must increase their focus on the collections process or risk falling behind their competitors.

Non-payment of credit card debt, credit card defaults and bankruptcies have cost the retail consumer credit industry billions of dollars in revenue. Thus, there is a need to determine the most cost effective and efficient collection strategies to be used on delinquent accounts. Furthermore, there is a need to automate and, thereby improve the determination as to what specific collection strategy should be used on a particular delinquent account or how collection resources should be divided among all delinquent accounts.

With delinquent accounts another area of concern is how to minimize "negative rolling" a circumstance in which an account rolls over into a higher delinquency level. Such accounts need to be identified automatically in advance to prevent such negative rolling. Very few efforts have been made to understand, or attempt to predict, the outcome of a contact with a consumer or credit card member by use of computerized record keeping. Heretofore, a consumer was contacted again and again with varying degrees of intensity. A phone contact could result in a payment made on the account or alienation of the consumer. Since consumer alienation is generally to be avoided, an automated predictive process or technique that minimizes consumer alienation is an important collection tool. Moreover, some consumers respond better to mailings than phone contacts or respond to second contacts but not first contacts. Insight into the likely response of a consumer achieved through computerized analysis greatly improve the likelihood of a successful contact.

Equally importantly, for a credit card issuer, and its collection department or collection agency, is to determine from its computer database how to optimize the use of collection resources. For example, use of collection resource 'A', a phone contact agent for example, may result in a certain aggregate payment amount from two separate accounts. However, use of collection resource 'A' against one of the accounts and a cheaper collection resource 'B', a mailing for example, against the other account might result in the same aggregate total income, but at a lower cost.

One attempt to address the problem of optimizing resource allocation is an article entitled "Managing Consumer Credit Delinquency in the US Economy: A Multi-Billion Dollar Management Science Application" by William M. Makuch et al., Interfaces, vol. 22, January–February 1992, pages 90–109. The Makuch article describes a system for managing credit card delinquency debt by improving the allocation of limited collection resources to maximize net collection over multiple billing periods. Unlike the present system, the calculation of the Makuch system is performed with the assignment of a constant collection strategy used for all billing periods. One of the overall goal of the present system is to automatically determine the optimal collection strategy to utilize in order to select the most efficient collection method for each account for each billing cycle.

SUMMARY OF THE INVENTION

The present automated invention addresses these shortcomings and provides a computerized method and apparatus for maximizing the utilization of collection resources used to generate payments toward delinquent consumers' accounts. The method of the present invention automatically groups consumers into a response category based upon a computed estimation of the consumer's response to a particular collection strategy. According to the method of the invention, factors, such as the consumer's payment history, date of last payment, and delinquency history are stored within the computer system database and used to automatically characterize the consumer and group the consumer into a subgroup with other consumers that are predicted to have a similar response to the same collection strategy. Thus, the invention automatically identifies a collection strategy and a population of individual consumers and automatically defines at least one response category in terms of estimated consumer response to a collection strategy.

The present invention also addresses how to compute an estimate of an expected return for a given collection strategy or how to automatically predict when the use of a particular collection resource has no effect so as to be able to go directly to the most effective resource available.

The invention is implemented by a computer program executable on a computer which accomplishes the various steps in the process of optimizing collection resources.

In view of the foregoing, it is an object of the present invention to determine which collection strategy should be used on a particular delinquent account.

Another object is to determine how should collection resources be divided among all delinquent accounts.

It is a further object to determine which delinquent accounts should be targeted to minimize negative rolling and to maximize total collections.

It is a further object to calculate what is the expected return of a collection strategy.

It is another object to determine how historical, current, and future account data can be used to help predict future behavior of a delinquent consumer.

It is a further object to determine when should delinquent accounts be dropped into collections.

BRIEF DESCRIPTION OF THE DRAWINGS

FIG. 3 is a table of strategy attributes.

FIG. 4 is a table of response predictors.

FIG. 5 illustrates exemplary response characteristics and assignment characteristics for two strategy response categories.

FIG. 6 illustrates the number of strategy response categories used for each delinquency phase and some exemplary predictors used to assign consumers to a strategy response category within a delinquency phase.

FIG. 7 shows exemplary probability data for a minimum monthly payment.

FIGS. 14–19 illustrate exemplary characteristics of individual strategy response categories broken down by delinquency phase.

DETAILED DESCRIPTION OF THE DRAWINGS

Figure 1A:
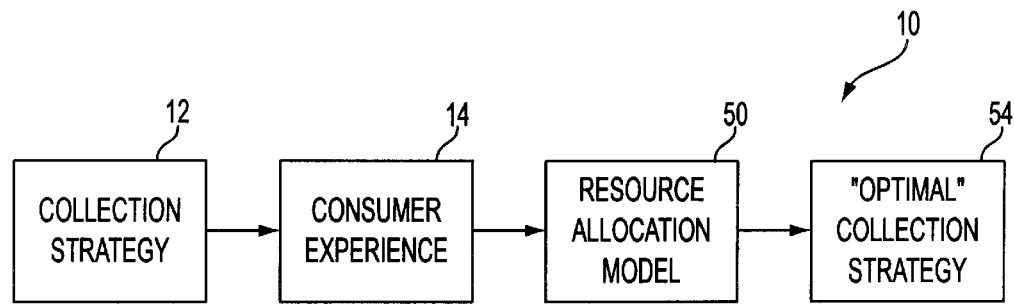
FIG. 1A is a general block diagram of a computerized collection strategy model.

The present invention is a computerized collection strategy model 10 that optimizes the use of collection resources by determining an optimum collection strategy to be used for each delinquent account. The collection strategy model 10 comprises an automated method as illustrated in FIG. 1A and includes the steps of first determining how a collection strategy (12) is converted into something the consumer/credit card member experiences (14), based on the connect and contact probabilities (24). Next the system automatically evaluates how the consumer will react to that "experience". Will the consumer make one or more payments? How much will they pay? Also historical data will be used to estimate how effective a consumer/credit card member experience (14) is on a consumer. At this stage, the system can also estimate the amount of resources that will be expended during the collection strategy. Once the system estimates the payments and resources requirement (22) for each collection strategy the Resource Allocation Model (50) determines what collection strategy for each account (54) best utilizes the available collection resources (22).

Figure 1B:
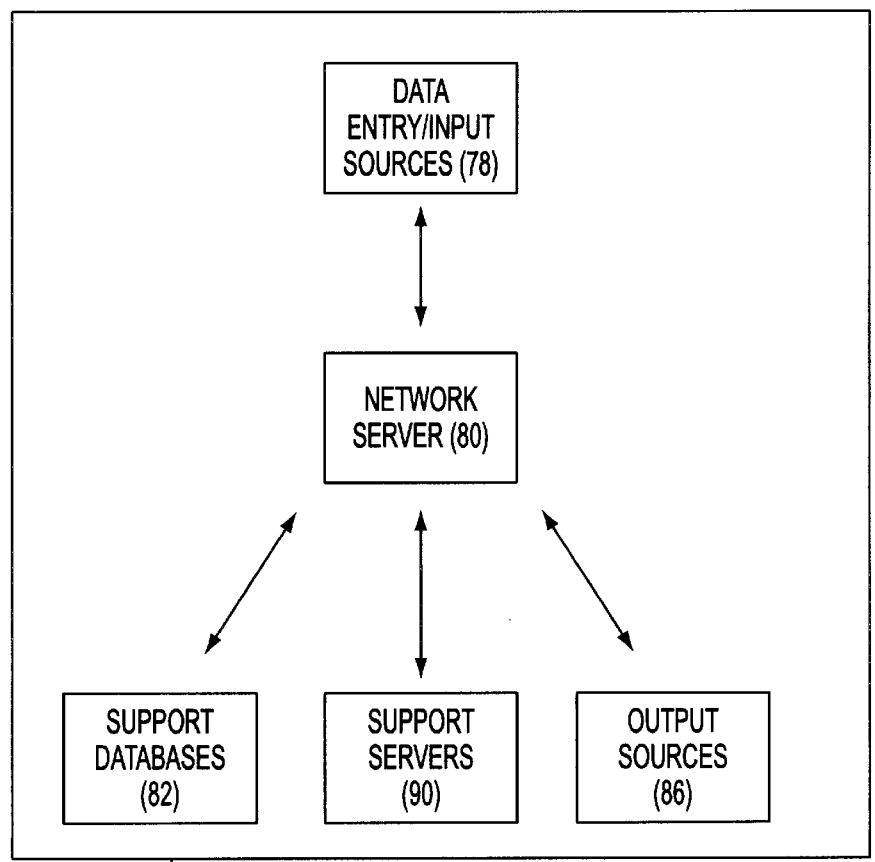
FIG. 1B shows a block diagram of the computerized collection strategy model.

Referring to FIG. 1B, the system (10) includes Data Entry/Input Sources (78), a Network Server (80), Support Databases (82), Support Servers (84) and Output Sources (86). Data Entry/Input Sources receive and prioritize the incoming data. The incoming information may be entered into the system (10) at an input terminal which displays a graphical user interface or may be accessed from storage databases or other input sources. The incoming information is then transferred to the Network Server (80) which is the central processor that performs the processes and interacts with the Support Databases (88), Support Servers (90) and Output Sources (86). The Support Databases (88) and the Support Servers (90) operate to storage compile or process data for the operation of the system. The Output Sources (86) can be directed to a printer, a computer, a modem, a facsimile transmission or any other form of electronic or telecommunication transmission. Operation and programming of such conventional computer hardware/software are well-known in the art and therefore a detailed discussion of such operating principles is not included herein.

Figure 2:
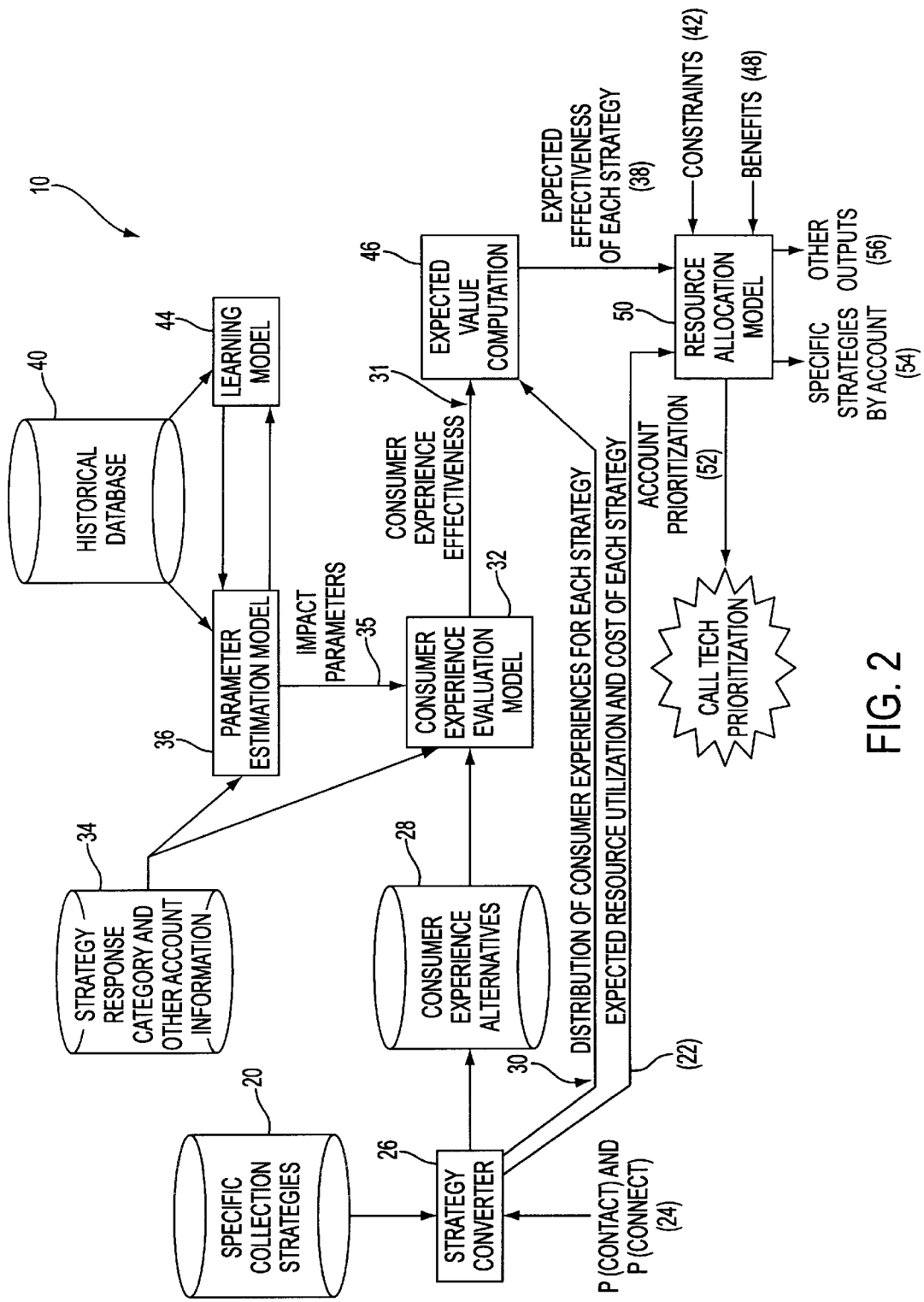
FIG. 2 is a more detailed block diagram of the computerized collection strategy model of FIG. 1A.

FIG. 2 provides a more detailed view of the operation of the computer model (10). The computer model 10 includes a plurality of collection strategies (20). A strategy converter (26) automatically takes collection strategy (12), from the collection of strategies (20) along with a probability of connect and a probability of contact (24), and simulates what the consumer will actually experience (14). Because of the uncertainty around contacts (24), a specific collection strategy (12) could lead to multiple options, such as 2 phone contacts or 3 phone contacts or 1 mailing. The strategy converter (26) automatically considers all of the possible consumer experiences (14) for a specific collection strategy (12) and estimates a probability associated with each. The converter (26) also calculates the expected amount of resources (22) that the specific collection strategy (12) will use, as well as the expected cost of implementing the strategy (22).

The strategy converter (26) autonmatically outputs all the possible consumer experience alternatives (54) to the consumer experience evaluation model (32) which estimates the effectiveness consumer experiences (31). Other inputs into the consumer experience evaluation model (32) are the characteristics of the delinquent account (34) and impact parameters (35). The impact parameters (35) are estimated in the parameter estimation model (36) based on the historical database (40), via linear regression, logistic regression, discriminant analysis, or some other statistical technique. The parameter estimation model (36) and the consumer experience evaluation model (32), taken together, provide the model's strategy evaluation functionality.

A learning model (44) works closely with the parameter estimation model (36). The parameter estimation model (36) automatically calculates new "impact parameters" (35) and the learning model (44) compares the new parameters and the old parameters to see which ones are better.

An expected value computation (46) automatically calculates the expected effectiveness of each specific collection strategy (12). For each specific collection strategy (19), a known probability of each consumer experience (30) and a known effectiveness of each consumer experience (31) allows calculations of the expected effectiveness (38).

A resource allocation model (50) uses the expected effectiveness of each specific collection strategy (38), the expected resource utilization and cost of each specific collection strategy (22), constraint information concerning total resources (42), and information about the objective function or benefits (48) to automatically determine the best specific collection numbers for each account that can assist account prioritization (52) and strategy implementation (54). Other sources of output (56) may be generated at the Resource Allocation Model Subroutine (50).

One aspect of the invention includes the use of strategy response categories (SRCs) (34). SRCs (34) are groups of consumers who are likely to respond similarly to collections strategies. A key aspect to grouping consumers in an SRC (34) is the determination of characteristics or other information that could be used to assign delinquent consumers to a particular SRC (34).

SRCs (34) are defined so as to be mutually exclusive. That is, at a given point in time, each delinquent consumer is assigned to exactly one SRC (34). However, consumers can switch between SRCs (34) over time, as more information is gathered about the account and/or the delinquency incident. The SRC (34) definitions themselves remain constant over time.

The automated process of defining SRCs (34) includes identifying strategies and selecting strategy response predictors (58) (see FIG. 4) that predict a consumer's response to a strategy (12). A strategy (12) is defined as the set of actions experienced by the consumer during a particular time frame, preferably a month. It is important to note only strategies actually experienced by the consumer are considered. For example a consumer would not be aware of a "review account" action and would not experience it. Thus, a review account action would not be included in a strategy.

Strategies (20) are further defined automatically by the consumer's experience (14) characterized in terms of attributes (92), which can include the number of phone contacts or mailings per month, messages per week, pattern of intensity, tone used in a mailing, and whether a male or female collector contact is desirable or the like as shown in FIG. 3. The attributes (92) can be automatically formatted into tiers based on their relative effectiveness in predicting consumer response. A list of attributes (92), separated into tiers, is illustrated in FIG. 3, but it will be understood that this list is not all-inclusive, and many other attributes can be applied to define strategies (20).

Strategy response predictors (58) are variables that automatically predict whether or not a consumer will make a payment. They include account characteristics, consumer demographics, previous collections strategies tried and previous response to collections strategies. An illustrative list of strategy response predictors is given in FIG. 4. Again, FIG. 4 is not all-inclusive and other predictors may exist.

One of the best predictors (58) of consumer response is the delinquency phase shown in FIG. 6, which is determined by the number of days the consumer is delinquent at the beginning of the strategy window. In particular, delinquency phase 0 means that the consumer is 30 days delinquent at the beginning of the strategy window. Delinquency phase 1 means that the consumer is 31–59 days delinquent at the beginning of the strategy window, delinquency phase 2 means that the consumer is 60–89 days delinquent, and so on.

Referring to FIGS. 8–13, the automated process of defining SRCs (34) can be visualized as a tree, with the branches breaking off on the basis of the strategy response predictors (58). At the top of the tree, all the delinquent consumers are together in one group. This "root node" then "branches" into groups, and those groups are divided into subgroups, and so on. At the bottom of the tree, each end node corresponds to an SRC (34). To automatically assign a consumer to a specific SRC (34), one can begin at the top of the tree and follow the appropriate branches down the tree.

In a preferred SRC tree, delinquency phase is the first variable that divides the delinquent population, forming six groups with different levels of delinquency (FIG. 6, FIGS. 8–13). Using the delinquency phase as a basic defining predictor, an SRC "tree" can be generated using delinquency phase as a first level of the tree and other predictors to define second, third, and fourth levels of the tree (FIGS. 8–13). Particular predictors can be selected based on achieving certain goals. As another example of a preferred embodiment, collectibility can serve as a primary goal to be pursued at the upper levels of the SRC tree, while strategy differentiation is a secondary goal to be pursued at lower levels of the SRC tree. Once the primary and secondary goals are defined, predictors can be analyzed for their ability to predict success in achieving the defined goals within each delinquency phase. If each delinquency phase is considered as a separate problem, different predictors may be more accurate for each delinquency phase. For example, in delinquency phases 0 and 1, "behavior score" may be most accurate in predicting collectibility, whereas in delinquency phase 2 the number of previous delinquencies may be most accurate.

Figure 8:
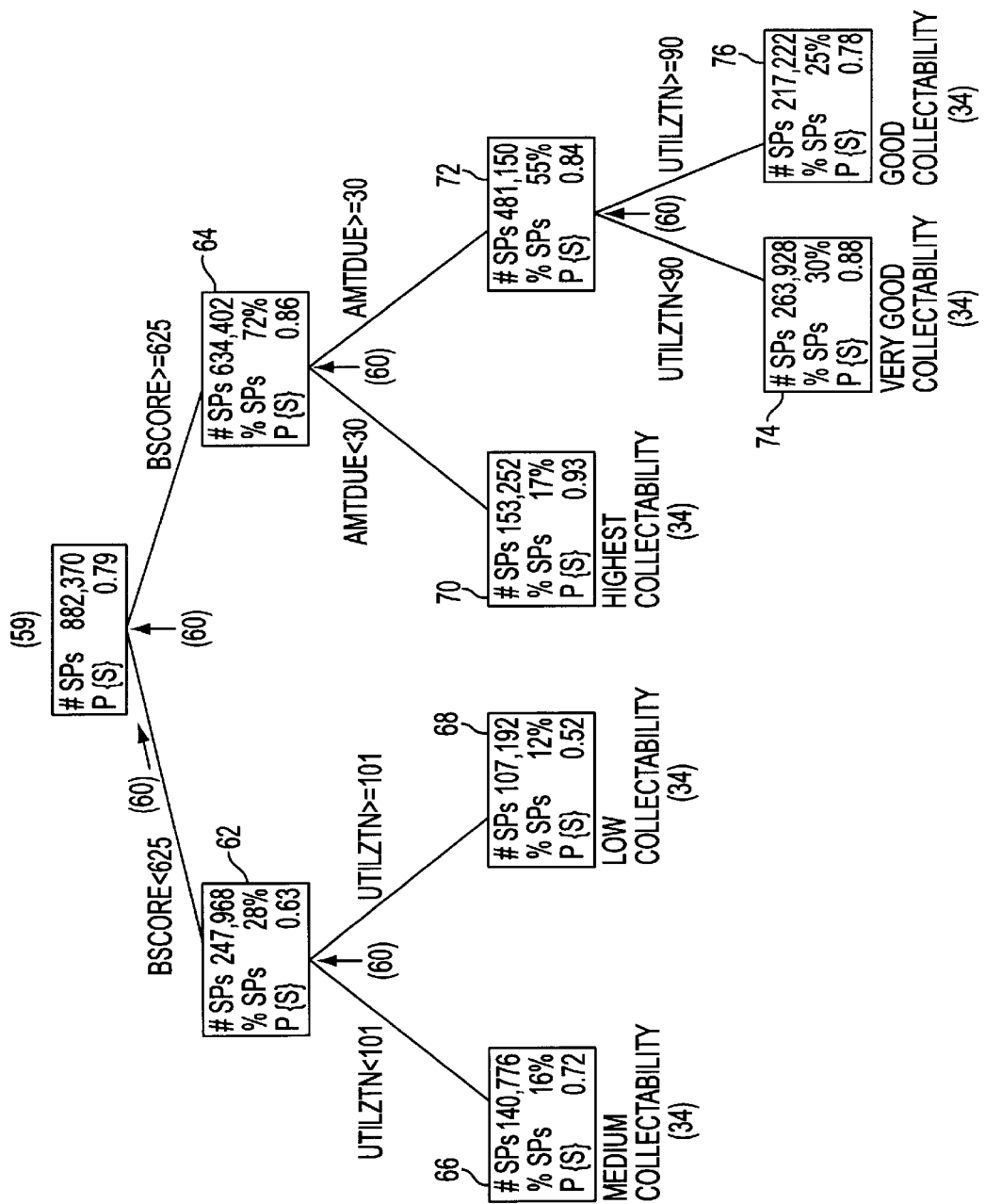
FIGS. 8–13 illustrate delinquency trees for various delinquency phases.

In order to automatically select predictors for each delinquency phase, all of the predictors are analyzed automatically for "breakpoints" or dividing points (60) for further defining the next level on the SRC tree. Since each breakpoint (60) divides the members (59) in the SRC tree within the delinquency phase into two groups, the predictors (58) must be analyzed to find a value that automatically predicts collectibility and provides strategy differentiation between the two groups formed by the breakpoint (60). For example, in delinquency phase 0 (FIG. 8), the predictor "behavior score" with a value of 650 proved to be an appropriate breakpoint for dividing the population of the first level into two groups (62), (64) forming the second level of the SRC tree, as illustrated in FIG. 8. The two groups (62), (64) in the second level are differentiable with respect to collectibility when further divided by another predictor.

The automated breakpoint (60) analysis is conducted by assuming that a particular predictor (58) is the next predictor in the tree. Several values of the predictor are examined to determine which value provides the best differentiation of strategy success. A CART analysis and a stepwise discriminant analysis is run on collectibility and on each tier 1 attribute level (FIG. 3). The output of these analyses provides an insight into the differentiation between collectibility and between response to various strategy attributes (92).

It should be noted that different predictors (58) can be used within a particular level of the SRC tree. As shown in FIG. 8, a behavior score of 625 divided the initial population of delinquency phase 0 into two second level groups (62), (64). However, each of the second level groups (62), (64) is further divided into two third level groups (66), (68), (70), (72) using different predictors. In particular, "utilization" was used to break out two third level groups (66), (68) from the second level group (62). A further breakpoint analysis using other predictors did not improve on the predicted collectibility or strategy differentiation, so third level groups (66), (68) were left as final strategy response categories (34).

In FIG. 8, the second level group (64) was divided into the two third level groups (70), (72) using the "amount due" predictor rather than "utilization." Again, further analysis did not yield any improvement over the third level group (70), which was retained as a third strategy response category. Further breakpoint analysis on the third level group (72) indicated an improvement by dividing the group (72) into two fourth level groups (74), (76) using the "utilization" predictor. The two fourth level groups (74), (76) became fourth and fifth strategy response categories.

The SRCs (34) for delinquency phase 0, illustrated in FIG. 8. are differentiated primarily on collectability, with little difference between the SRCs (34) on how they respond to different collection strategies (12). This is consistent with the nature of delinquency phase 0 accounts, because the primary issue is when consumers should be dropped into collections and worked, as opposed to how hard they should actually be worked.

To assign the consumers in delinquency phase 0 to a specific SRC (34), the population was automatically split on a behavior score of 625. This breaks consumers into a good group (64) and a bad group (62). The bad consumers (62) are much more likely to have been delinquent recently and also have a higher percentage of cash transactions.

The bad consumers (62) were split on utilization of 101, dividing the consumers into those who are overextended (66) versus those who are not (68). The consumers with a low utilization (66) are more likely to have been delinquent recently than those with a high utilization (68). Not surprisingly, the low utilization (66) consumers also tend to have higher credit lines and are more likely to be "Gold" or "Select" consumers.

The good consumers (64) are divided based on amount due of $30, because the good consumers who owe very little (70) are much more likely (93%) to make a payment. The consumers who owe more (72) are automatically divided based on a utilization of 90, which—like the bad consumers—divides this group into those who are overextended (74) versus those who are not (76). Like the bad consumers, those with a low utilization (74) tend to have higher credit lines and are more likely to be "Gold" or "Select" consumers.

These SRCs (34) are very intuitive, and the probabilities of success within the SRCs are automatically ranked in the order that one would expect. These SRCs (34) should be very effective in automatically determining which consumers should be dropped into collections early versus those who can wait.

Figure 9:
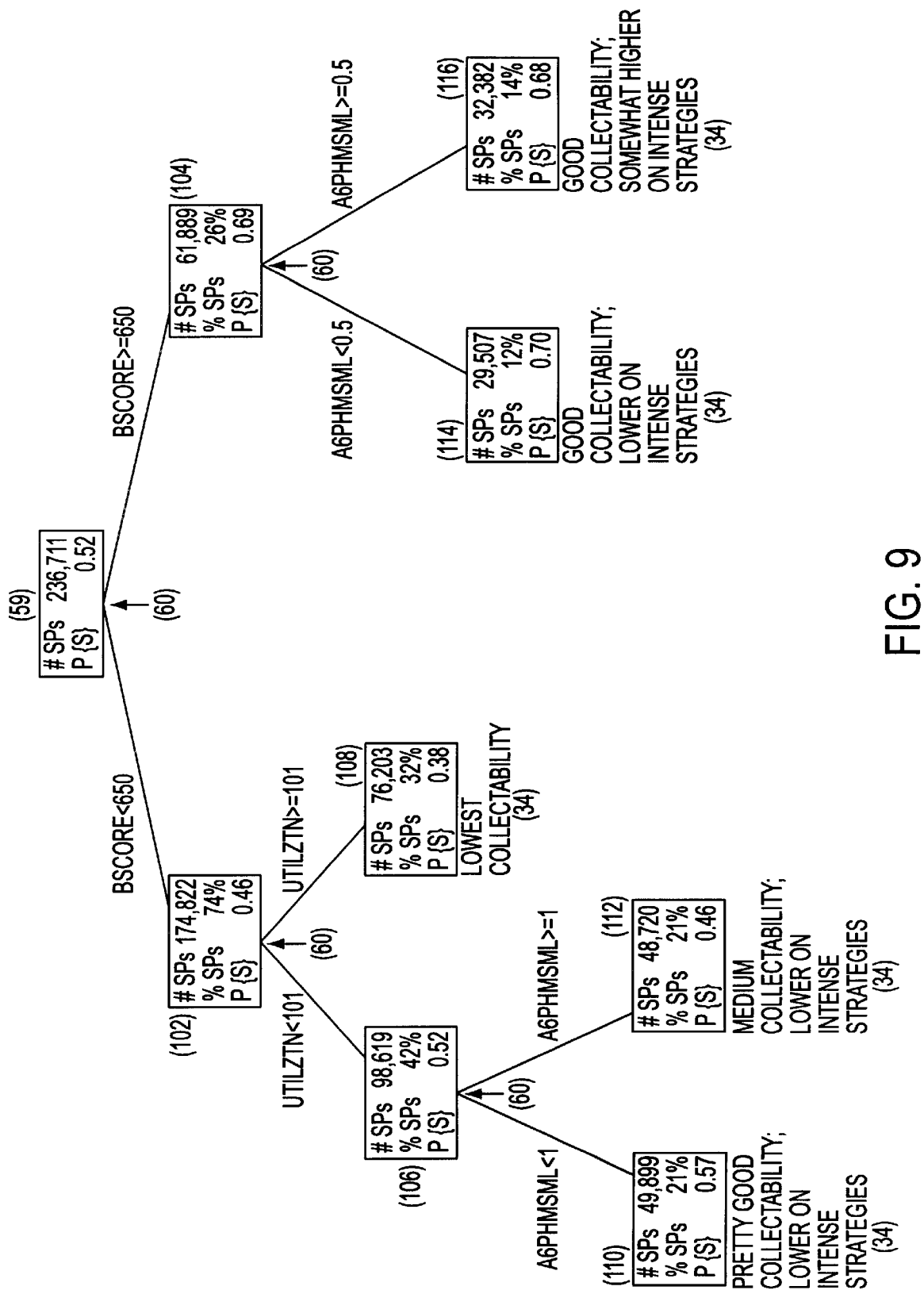

The SRCs (34) in delinquency phase 1, illustrated in FIG. 9, provide good differentiation on collectability. along with some differentiation on how the consumers respond to collection strategies (20). Like delinquency phase 0, the first division is on behavior score, but this time using a score of 650. Once again, this breaks consumers (59) into good (64) and bad (62) categories for collectability. The next variables provide the collection strategy differentiation. As in delinquency phase 0, the bad consumers (62) are much more likely to have been delinquent recently and tend to have a higher percentage of cash transactions, as well as higher cash balances.

The bad consumers (102) are first automatically divided based on whether their utilization 101 or utilization >=101. For the consumers with a low utilization (106), the automated break occurs at A6PHMSML (the average number of phone contacts, messages, and mailings in the past six months) of 1 (110, 112). This provides three SRCs (34) for the bad consumers (102), and they are differentiated primarily on collectability. The low utilization consumers (106) typically have higher cash balances, but their percentage of cash transaction is lower than the high utilization consumers (108). Naturally. the consumers who have been contacted more in the last six months (112) (higher A6PHMSML) are less likely to be new accounts and are more likely to have been delinquent recently.

For the good consumers (104), A6PHMSML of 0.5, provides some strategy differentiation. Although the collectability of these two groups is very similar, the consumers who have received more contacts (116), messages, or mailings in the past six months are somewhat more likely to respond to mild strategies and substantially more likely to respond to intense strategies. This is probably because they are used to being delinquent and are therefore more likely to make a payment. In fact, the good consumers who have not received many contacts (114), messages, or mailings in the past six months are no more likely to respond to intense strategies than the bad consumers. Like the bad consumers, those consumers who have been contacted more in the past six months (116) are less likely to be new accounts.

Figure 10:
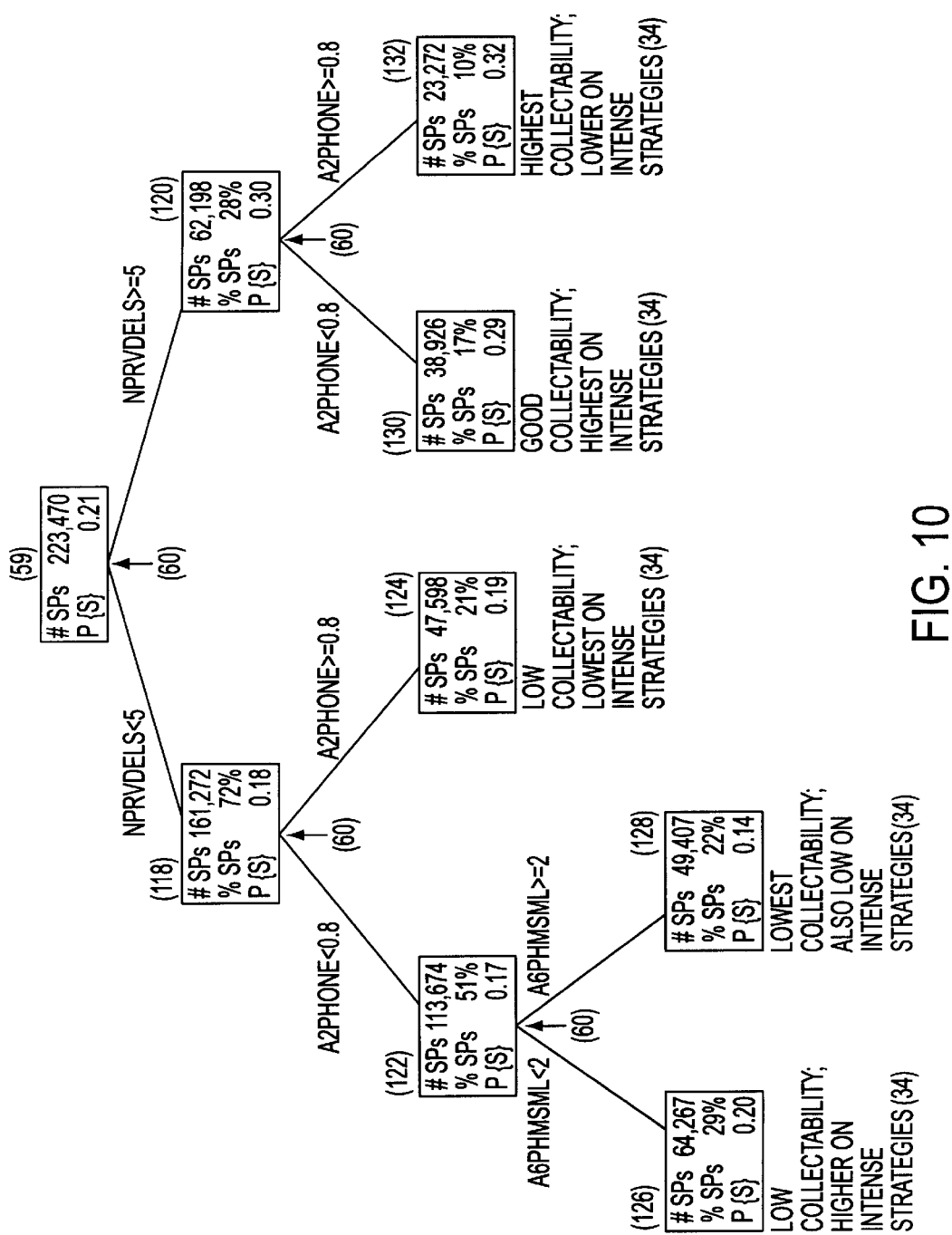

In delinquency phase 2, illustrated in FIG. 10, even more strategy differentiation across the SRCs (34) becomes apparent. The first division of delinquency phase 2 consumers is based on whether the consumer has had five or more previous delinquency incidents (118, 120), and this provides good differentiation on collectability.

For both of these groups, the next break is on A2PHONE of 0.8, which divides the consumers into those who have had contacts recently (124, 132) versus those who have not (122, 130). In general, the consumers who have not had contacts recently (122, 130) are somewhat more likely to respond to mild strategies and quite a bit more likely to respond to intense strategies.

For the consumers who have not had five delinquency incidents and have not had many phone contacts in the past two months (122), the next break is based on whether they have had two or more phone contacts, messages, or mailings per month in the last six months (126, 128). This makes the strategy differentiation described above even more pronounced.

All of the consumers who have not been contacted much in the last two months (126) are much more likely to be in the deceased queue than the other SRCs, although this is even more pronounced for the consumers who have had fewer than five previous delinquency incidents. Those consumers who have been contacted frequently in the past two months (128) (no matter how many previous delinquency incidents they have had) are much more likely to have had a broken promise.

Figure 11:
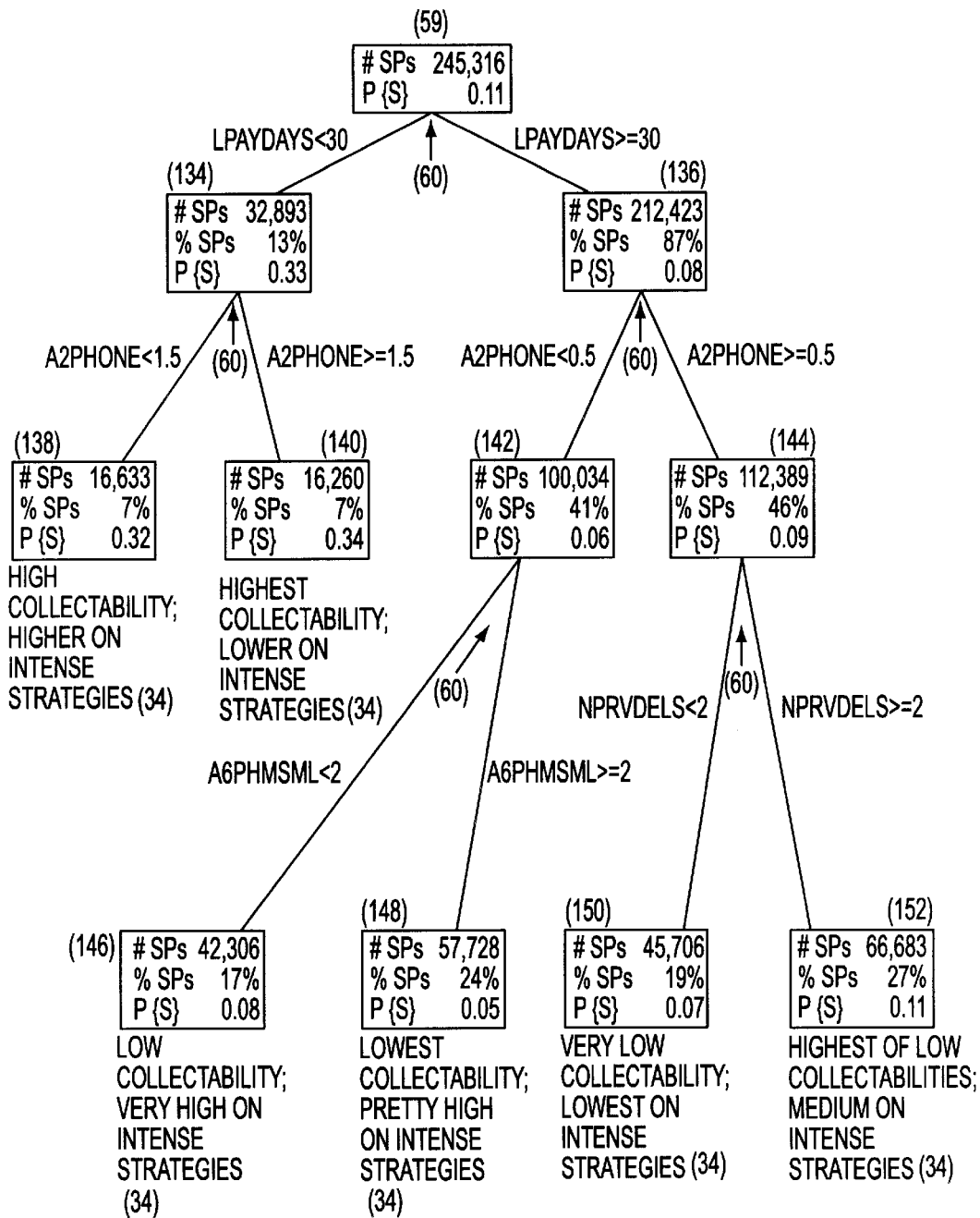

The first break on delinquency phase 3/4, as illustrated in FIG. 11. is on whether or not the consumer (59) has made payment in the last 30 days (134, 136) (LPAYDAYS 30). This provides excellent differentiation on collectability: a 0.08 probability of success for consumers who have not made a payment recently (136) versus a 0.33 probability of success for those who have (134). Generally, the consumers who have made a payment (134) in the last 30 days are less likely to be new accounts and have typically been more delinquent in the last two years. Eeach of these two branches are further divided on A2PHONE (138, 140, 142, 144).

For the consumers who have paid in the last 30 days (134) the break is on A2PHONE 1.5, and as for delinquency phase 2, the consumers who have not been contacted recently are more likely to respond to mild strategies and much more likely to respond to intense strategies. The consumers in this group who have not been contacted recently (138) are more likely to be in a skip queue than those who have been contacted recently.

For consumers who have not paid in the last 30 days (136), A2PHONE 0.5 is the breakpoint (60). and this also provides good differentiation on mild and intense strategies. Once again those who have not been contacted recently (142) are more likely to be in a skip queue than those who have (144).

The strategy differentiation is increased by breaking the consumers with A2PHONE <0.5 142 at A6PHMSML 2 (146, 148) and breaking the consumers with A2PHONE>= 0.5 on whether they have two or more previous delinquencies (150, 152). The consumers who have fewer than two previous delinquencies (150) are much more likely to be new accounts than those who have two or more previous delinquencies (152).

Figure 12:
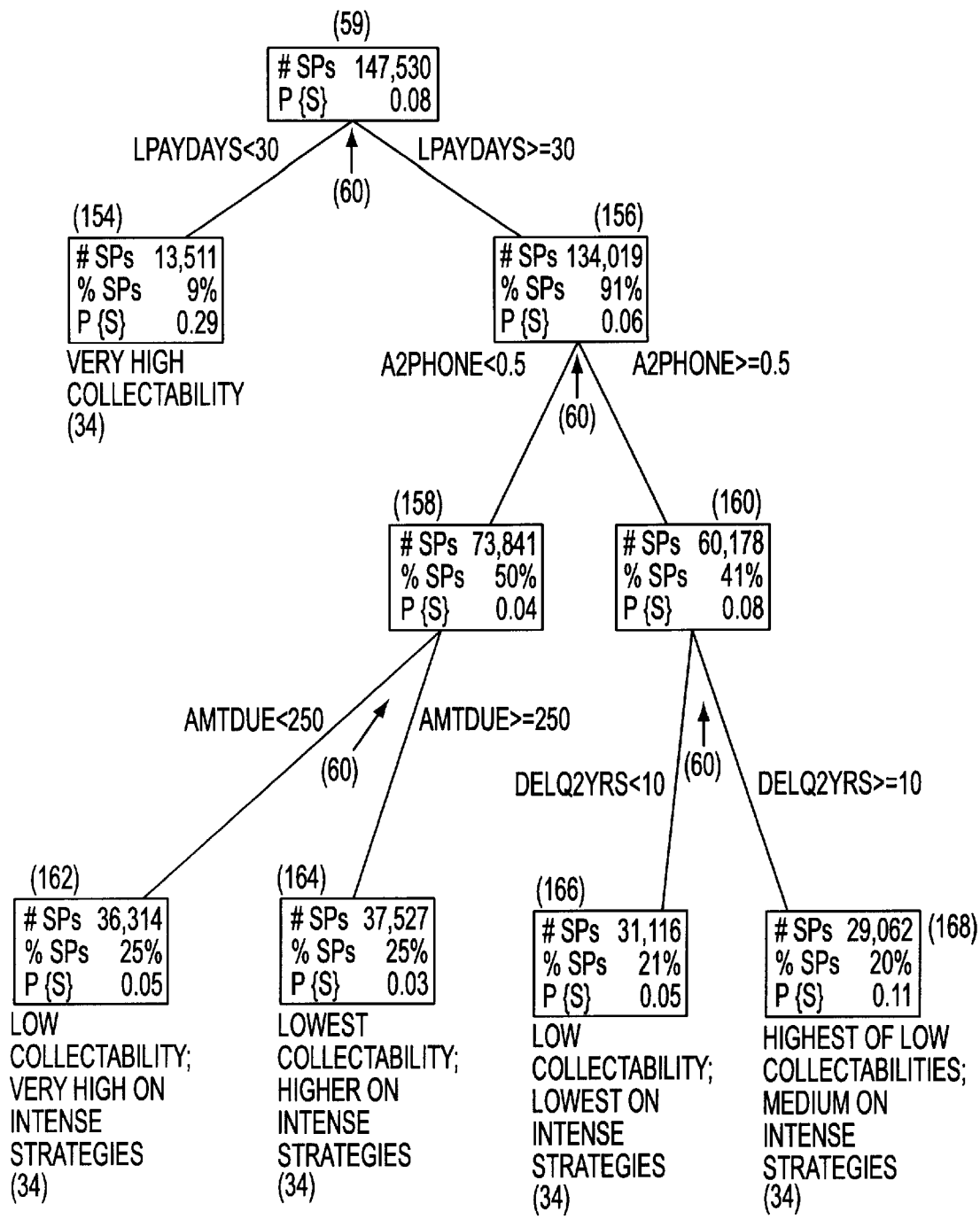

Referring to FIG. 12 the first automated break for delinquency phase 5/6 is on LPAYDAYS 30 (154, 156) (whether or not the consumer has made a payment in the last month). The consumers who made a payment recently (154) are much more likely to make a payment than all the other consumers in delinquency phase 5/6, no matter what strategy is implemented. Making at least one phone contact, however, has significant impact on the probability of getting a payment. The consumers who have made a payment recently (154) are not divided any further because there is little likelihood of any additional differentiation. Not surprisingly, the consumers who have made a payment in the last 30 days (154) are much less likely to be in a skip queue.

For consumers who have not made a payment recently (156), a first automated break on A2PHONE 0.5 (158, 160) achieves a good strategy differentiation. The group of consumers who have not been contacted recently (158) are much more likely to be in a skip queue, although if contacted, they are likely to make a payment.

For consumers with A2PHONE <0.5 (158), the breakpoint (60) is an amount due of $250. As expected, those consumers with a lower amount due (162) tend to have a lower cash balance and they are also less likely to have had transactions declined recently. Not surprisingly, the consumers with a higher amount due (164) have the lowest collectability among the SRCs in this delinquency phase (3%), but have a much higher probability of making a payment when intense strategies are used.

For consumers with A2PHONE >=0.5 (160), the breakpoint is DELQ2YRS 10 (166, 168). The consumers who have not been delinquent (166) as much during the past two years are more likely to be in the skip queue, have higher cash balances, and tend to have had more transactions declined. These consumers have an overall probability of success of 5% (one of the lowest among the SRCs in this delinquency phase) and do not show much improvement with intense strategies, making them potential outsourcing candidates.

Both of these breaks provide additional differentiation on collection strategies. The primary issue is whether or not those consumers who are likely to respond to intense collection strategies can be contacted.

Figure 13:
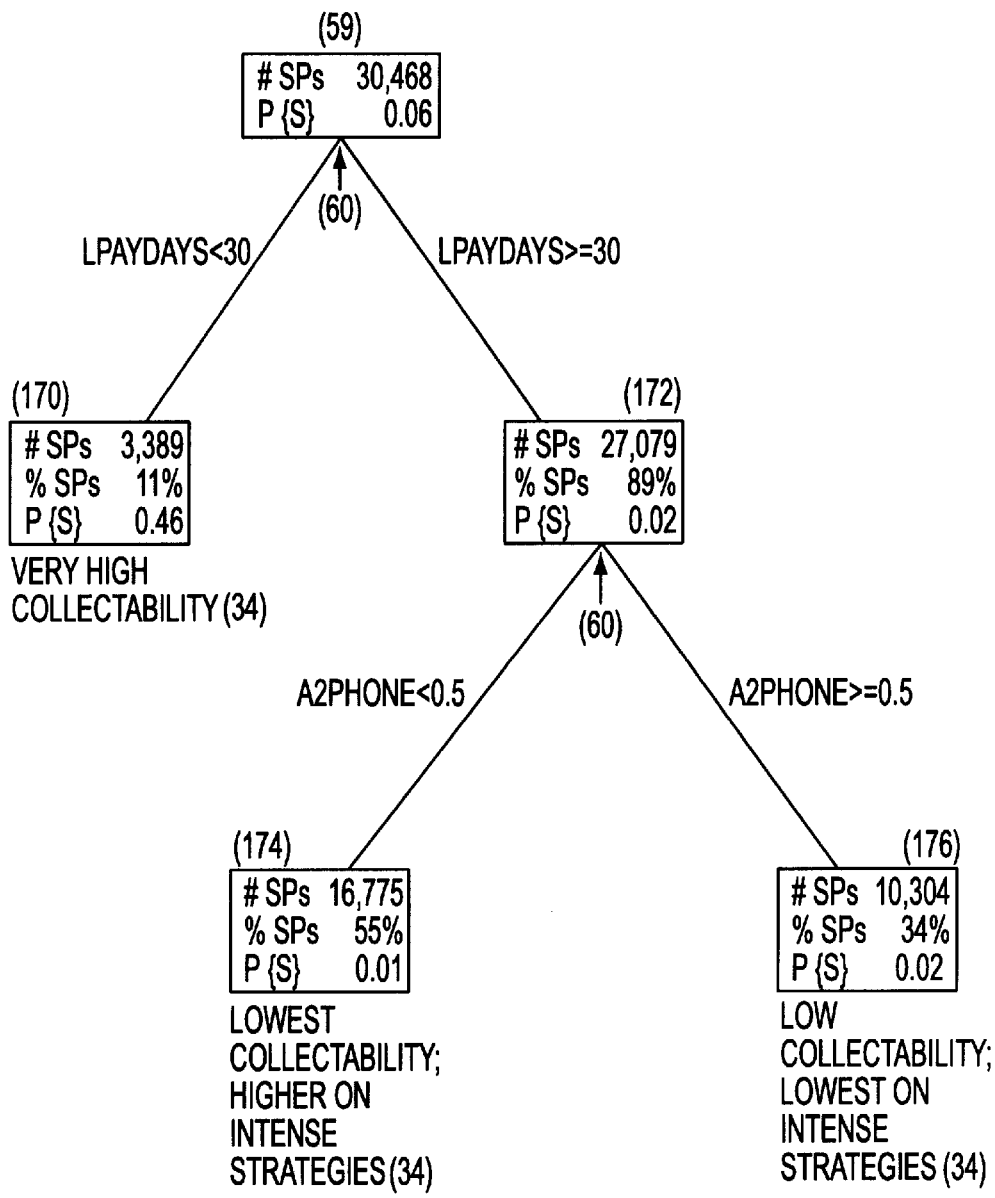

For SRCs in delinquency phase 7, illustrated in FIG. 13, the first breakpoint is whether or not the consumer (59) made a payment in the last month (LPAYDAYS 30) (170, 172). The consumers who have made a payment recently (170) have an astonishing overall collectability of 46%. The consumers who have not made a payment recently (172) have an overall collectability of only 2%.

Consumers who have made a payment recently are not broken further. Consumers who have not made a payment recently (172) are broken at A2PHONE 0.5 (174, 176). The strategy differentiation on this break is not as significant as for delinquency phases 3/4 and 5/6, but the results still provide some information. The consumers who have not been contacted recently (174) are more likely to make a payment after an intense strategy if they can be contacted. However, they are also much more likely to be in a skip queue than the other delinquency phase 7 SRCs.

The information presented in the SRC trees in FIGS. 8–13 is presented in tabular form in FIGS. 5 and 14–19. The tabular data also includes a comparison of the responses to collection strategies for selected SRCs to the responses in other SRCs in the same delinquency phase.

The SRCs (34) provide guidance on which types of collections strategies are most likely to be successful on different consumer populations. However, they do not consider the costs, benefits, or feasibility of implementing those strategies. Because of this the SRCs (34) alone do not indicated which specific strategies should be applied to each delinquent consumer. In order to recommend specific strategies for delinquent consumers, the SRCs (34) are automatically input to the collection strategy model (10). The strategy collection model (10) will apply a behavioral choice model to the consumers in each SRC to estimate each consumer's response to collection strategies. The resource allocation model (50) will then automatically assess the costs and expected benefits of the collection strategies, and will recommend the best strategies to use on all delinquent consumers.

Referring again to FIG. 2. the strategy converter (26) takes a specific collection strategy (12) and an account's probability of contact and probability of connect (24) and creates from these a distribution of consumer experiences (30). A specific collection strategy might dictate 5 attempts to contact a consumer over the phone in one month. It is possible that each attempt is successful and the consumer is contacted 5 times in that month. Or it might be very difficult to contact the consumer over the phone and none of the attempts are successful. If "Make 5 attempts" is the entire specific collection strategy to be applied to this account then there are 6 possible consumer experiences (14): 0 to 5 phone contacts. This list of possible consumer experiences (14) along with the probability of each experience actually taking place form the distribution of consumer experiences (30).

The strategy converter (26) takes as input a file representation of each consumer experience (14) to a specific collection strategy (12). These files are automatically read in and translated into a format that will be used by the strategy converter (26). The strategy converter (26) also needs to know which accounts to process and the average probability of contact and connect for each of these accounts (24).

The strategy converter (26) can use a number of techniques to compute consumer experiences (14). The fastest technique is to access a database containing a table where the entries in the table are computed in advance using simulation. If the table is too large it would be acceptable to either run a simulation at the time the experiences are evaluated, or use some kind of heuristic to approximate the probability distribution of the consumer experiences.

In addition to determining the various consumer experiences (14) and the probability of each (30), the strategy converter (26) must also automatically determine the expected cost and amount of resources used for each specific collection strategy (22). For example. in the "Make 5 attempts" sample strategy, the "one-contact" experience is less expensive (in long distance charges) and uses fewer resources (fewer collection agent hours) than does the "five-contact" experience.

The converter (26) presents the consumer experiences (14) to the consumer experience evaluation model (32). The converter (26) also computes the expected cost and expected resource usage of each strategy (22), and passes this information to the resource allocation model (50). The probabilities associated with the experiences (30) are passed to the expected value computation model (46) that computes the expected effectiveness (38) of each specific collection strategy.

Both the parameter estimation model (36) and the learning model (44) rely heavily on the historical database (40) for information about how delinquent consumers have responded to collections strategies in the past. In order for this information to be used, the parameter estimation model (36) converts SRC (34) information and raw data on actions, payments, etc. into sample points that capture the consumer experience (14) and the consumer's response to the consumer experience (14).

The time frame for each consumer experience (14) is from one cycle date to the next cycle date. In other words. the "strategy" that the consumer experiences (14) consists of all the actions taken during a month-long time frame from one cycle date to the next. There will be no overlap of consumer experiences: the next sample point begins at the next cycle date. For each delinquency incident. the parameter estimation model (36) computes one or more sample points, depending on the length of the delinquency incident.

Each sample point will be made up of three parts:

consumer experience characterization (14), consumer response, and candidate strategy response predictors.

The model (10) characterizes each consumer experience (14) with descriptive attributes (92). Some key attributes

(92) for characterizing consumer experiences (14) can include "experienced something" versus "experienced nothing," number of phone contacts, number of mailings, number of phone messages, pattern of intensity, whether the account is outsourced to a collection agency. and whether a letter or phone call is first in cycle 1 consumer experiences.

A consumer experience (14) is defined by specifying a value for each of the key attributes (92). so that the combination of attribute values captures the entire experience. For example, one consumer experience (14) might be experienced something 3 phone contacts; 0 mailings 1 phone message; increasing pattern of intensity; not outsourced; N/A for phone call/ letter first (because not cycle 1).

To determine the value of each attribute (92), the model looks at all the collections actions taken during the month. The model only considers actions that are noticeable to the consumer (e.g., the model does not count review account actions). In addition, the model (10) does not consider actions that are follow-ups to previous actions (e.g., reage confirmation letters).

The model (10) automatically counts incoming phone calls as normal phone calls when defining consumer experiences (14). However, because some consumers make many incoming calls, only one incoming call counts as a phone contact. If a consumer was contacted by a collector and also made one or more incoming calls the consumer experience (14) is characterized as two phone contacts. When characterizing cycle 1 consumer experiences (14), the model (10) ignores incoming calls that occur before any other actions since the account has not been worked yet and no actions were necessary from the model's perspective.

The model (10) uses some upper bounds for the attributes (92) that are continuous (e.g., number of phone contacts). The model (10) first identifies the maximum value that has occurred in past strategies (e.g., 6 phone contacts in one month are the most that have ever occurred) and then analyzes historical data from the historical database to determine if a different maximum works just as well (e.g., 5 contacts are no more or less effective than 6). Boundinio the continuous attributes (92) helps reduce the number of possible consumer experiences (14).

For example, cycle 1 consumer experiences (14) are fundamentally different from consumer experiences (14) in later cycles and therefore require some special attention when developing the sample points. Cycle 1 consumer experiences (14) include an initial period of "do nothing" before the account is dropped into collections, followed by a shortened strategy (assuming that the consumer did not make a payment before he/she was dropped). To characterized cycle 1 consumer experiences (14), the model (10) stores the number of days of "do nothing" and then characterizes the shortened strategy in terms of attributes.

The characterization of the second portion of cycle 1 consumer experiences (14) includes a smaller set of characterizations than later cycles. Some attributes (92) such as outsourcing are not appropriate for cycle 1 strategies. Other attributes (92) such as number of phone calls and number of mailings are appropriate but may have a more limited set of possible values. For example, it is unlikely that a consumer dropped at 50 days would receive more than two phone contacts between days 50 and 60. One attribute—whether or not a phone call or a letter is the first action once the consumer is dropped—is important to the definition of consumer experiences in cycle 1 but not in later cycles.

The second part of each sample point contains information pertaining to the consumer's response to the consumer experience (14). In particular, the sample point identifies two outcome measurements:

whether or not the consumer made a minimum monthly payment as a result of the consumer experience (14) (a binary variable), and the percentage of the full delinquent amount paid as a result of the consumer experience (a continuous variable).

To determine the above outcomes, the model (10) looks at all the payments that are made during the month. The model (10) treats multiple payments during the month as if it was one larger payment. It is possible to use a 0–3 day lag from the consumer experience cycle-to-cycle time frame (i.e., look at all the payments that are made between cycle date +3 and the next cycle date +3). Within a specific consumer experience time frame, the model 10 does not consider the timing of specific payments in relation to specific actions. This means that the following are characterized exactly the same way in the sample points:

phone contact at day 35, payment at day 45, phone contact at day 55, versus phone contact at day 38, phone contact at day 50, payment at day 57.

Although this simplification may not seem completely accurate in certain situations, there are no assumptions about action and payment timing that would be appropriate for every situation. This clean and simple logic will still result in high quality sample points. Consumer experiences (14) that involve outsourcing require some special logic, because payments may not be received until months after the account is outsourced.

The third part of each sample point is a set of variables candidate, strategy response predictors, that might have some additional predictive power above and beyond the strategy response predictors used to define the strategy responses categories (34). These candidate strategy response predictors can include account characteristics, consumer demographics, previous collections strategies, previous response to collection strategies, a consumer's history of making incoming calls and other appropriate predictors.

The model (10) automatically calculates an estimate of the consumer response to consumer experiences (14). In particular, the model (10) automatically computes two separate metrics of consumer response to a consumer experience (14):

the probability that a consumer will make a minimum monthly payment as a result of the consumer experience: P{MMP}, and the expected percentage of the full delinquent amount (FDA) that the credit cardholder will pay as a result of the consumer experience: E[%FDA].

A separate model is used to compute each of the two metrics.

Preferably the model (10) considers the following sample points within each candidate strategy response (34):

the proportion of consumers who made a minimum monthly payment {MMP} (both overall and as a result of consumer experience), the average percentage of full delinquent amount that was paid {%FDA} (both overall and as a result of each consumer experience), candidate strategy response predictor correlation, candidate strategy response predictor means, standard deviations, minimum values, maximum values, and distributions, distributions of consumer experience predictor values, and frequency of consumer experience occurrences.

After analyzing the sample points, the number of candidate strategy response predictors (58) should be reduced or fewer. These will be the candidate strategy response predictors (58) that will be part of the consumer experience evaluation model (32). After automatically computing the best candidate strategy response predictors based on the analyses described above (e.g., candidate strategy response predictor correlation), stepwise discriminant analysis can be run using both the payment amount (a continuous variable) as the outcome variable and using whether or not the minimum monthly payment {MMP} was made (a binary variable) as the outcome variable.

As discussed above, the automatic calculation of decisions about how to handle cycle 1 accounts are fundamentally different from decisions about how to handle delinquent accounts in later cycles. Cycle 1 consumer experience calculations include an initial period of "experience nothing" before the account is dropped into collections. followed by a shortened "active" strategy (assuming that the consumer did not make a payment before he/she was dropped). Because the model needs to automatically recommend the drop day as well as the specific collection strategy to implement once the consumer is dropped cycle 1 accounts require some additional analysis.

In order to automatically estimate the P{MMP} for cycle 1 accounts, the model (10) considers both metrics of the consumer experience (14). She P{MMP} for a specific drop day/consumer experience is the probability that the consumer makes a minimum monthly payment before being dropped, plus the probability that the consumer does not make a minimum monthly payment before being dropped but does make one after being dropped. To calculate this, for the "experience nothing" portion of the consumer experience the model estimates $P\{MM|P_n\}$, the probability that the consumer makes a minimum monthly payment during n days of "experience nothing." For the strategy portion (the second part) of the cycle 1 consumer experience, the model automatically estimates $P\{MM|P_{60-n}\}$, the probability that the consumer makes a minimum monthly payment during (60-n) days of collections actions. With the above estimates the model automatically calculates the overall P{MMP} for a particular cycle 1 consumer experience (including a specific drop day) as:

$P\{MMP\}=P\{MMP|N_n\}+(1-P\{MMP|DN_n\})*P\{MMP|A_{60-n}\}$=probability that the consumer makes a minimum monthly payment before being dropped, plus the probability that the consumer does not make a minimum monthly payment before being dropped but does make one after being dropped, if the consumer is dropped after the $n^{th}$ day.

To estimate $P\{MMP|N_n\}$—the probability that the consumer makes a minimum monthly payment during n days of "experience nothing"—the model (10) divides the historical data on cycle 1 accounts into groups of drop day/behavior score combinations that remove as much of the strategy bias as possible. Based on the same points in each group, the model (10) estimates the $P\{MMP|N_n\}$ using the population proportions and produce a table that stores these estimates. FIG. 7 shows an example of such a table. For a cycle 1 consumer with a behavior score of 720 who is automatically dropped at day 45, the model (10) estimates $P\{MMP|N_{\{45-49\}}\}$=0.75 using the historical data on the consumers with a behavior score of 710 or higher who have experienced no collections actions during the their first 19 days of delinquency (i.e., before day 50).

FIG. 7 is only an example and contains fictitious data. The groupings of drop days and behavior score are also just examples and will vary with specific applications. The model 10 can also subdivide the population further, using other variables (e.g., utilization) that have significant power in terms of predicting whether or not a consumer will make a payment before being dropped.

To estimate the strategy portion above—the probability that a consumer will make a minimum monthly payment during (60-n) days of collections actions—the model 10 uses the same considerations as in the later cycles. The impact parameters (35) will be different, but the underlying considerations will be the same.

As discussed above, the model 10 estimates E[%FDA] as one metric of consumer response to a strategy. For cycle 1, however, minimum monthly payments are always greater than or equal to the full delinquent amount (MPP=100% of FDA). For the model, the E[%FDA] for cycle 1 is simply equal to P{MMP}*100%, so E{%FDA} for cycle 1 is not explicitly considered.

The parameter estimation model (36) automatically calculates the impact parameters (35) separately for each SRC (34). This is important because the SRCs are groupings of consumers who respond similarly to collection strategies. The model (10) automatically assumes that a consumer's response to a consumer experience will be the same as the response of those consumers in the SRC who had that consumer experience.

The impact parameters (35) are then used as input to the consumer experience evaluation model (32). In the case that the parameter estimation model (36) is linear (e.g., with one term for each consumer experience predictor), the impact parameters (35) would simply be the coefficients that belong with each (predictor) term.

The automated process (36) of estimating the parameters (35) depends upon the statistical techniques used. If the parameter estimation model (36) uses logistic and/or linear regression, then the regression technique itself will estimate the parameters (35). If the parameter estimation model (36) uses a different technique a maximum likelihood estimator can be used to identify the best parameters (35). Nonlinear models would involve more complicated approaches to estimating the impact parameters.

Although the parameter estimation model (36) runs separately on each SRC (34), it uses the same underlying techniques as the model. In the logistic regression example, the same terms are used, but the coefficients are different for each SRC.

For example, for cycle 1 accounts the parameter estimation model (36) runs separately for each subpopulation (e.g., each cell shown in FIG. 7) so that the drop day/behavior score biases are reduced as much as possible. These subpopulations may be used in place of the cycle 1 strategy responses characteristics (34), or they can be incorporated into the SRC into cycle 1 subpopulations.

One additional task in developing the parameter estimation model (36) is to automatically determine the amount of historical data (40) that produces the most robust and useful parameters. If the consumer's responses to strategies in the past are consistent with responses to those same strategies today. then all of the historical data might be used. If there are trends in the consumer's response then only the sample points from the past six months or year should be used.

The parameter estimation model (36) is likely to be run automatically at the end of each calendar month, as new sample points are added to the consumer experience (14) database. At this time, the parameter estimation model (36)

automatically computes new impact parameters (35) and compares them with the ones currently being used. Based on this comparison and other information, a user can decide whether or not to use the new impact parameters (35). The learning model (44) discussed below provides additional information on automatically updating the impact parameters (35).

The purpose of the consumer experience evaluation model (32) is to compute P{MMP} (*) and E[%FDA] (*) as metrics of how a delinquent consumer will respond to a consumer experience (14). The consumer experience evaluation model (32) generates an estimate of these metrics for each delinquent consumer in need of a strategy, for every possible consumer experience (14). The consumer experience evaluation model (32) requires the following information in order to calculate P{MMP} and E[%FDA]:

delinquent accounts being run through the model (in need of a strategy), each delinquent account's strategy response (34), candidate strategy response predictor values in the consumer experience evaluation model for each delinquent accounts, predictor values for the consumer experience (58), and impact parameters (35) from the parameter estimation model for each strategy response (and for each cycle 1 subpopulation).

Using this information. the consumer experience evaluation model (32) applies the formula from each of the two forecasting models to each delinquent account.

External factors that might impact consumer response to strategies—in particular, economic factors—are not included explicitly in the model. In general, the model (10) assumes that the impact parameters (35) will capture any major external factors.

One exception to the above restriction is seasonality: the phenomenon that consumers might make fewer or more payments during certain times of the year (e.g., Christmas or April tax time). Since the impact parameters (35) are likely to be based on at least the past six months' sample points, they cannot capture seasonal effects that only last a month or two. If it is determined that seasonality is significant, the model (10) can include "seasonality factors" in the estimates of P{MMP} and E[%FDA]. These factor will be straightforward (either additive or multiplicative) and will be identical for every consumer and every consumer experience (14). For example, if it turns out that P{MMP} is reduced by 10% in January, the model (10) can multiply the consumer experience's original P{MMP} estimate by 0.9, for every consumer experience and every consumer.

The learning model (44) is a critical component of the complete model (10). The learning model's estimates of how a consumer will respond to a strategy P{MMP} and E[%FDA]) are generated by applying statistical techniques to recent historical data. However, as time passes, important changes may take place that must be captured in the model's forecasts: the user collects more data, runs additional tests, and signs up new consumers, the risk of consumers changes over time, and consumers that used to respond to certain strategies may not respond anymore. The learning model (44) ensures that the model (10) is not stagnant. As the delinquent population changes, the learning model (44) ensures that the model (10) reacts to those changes.

The learning model (44) learns through a variety of mechanisms, but the most important one is through recalibration of the impact parameters (35). On a regular basis (preferable monthly), the sample points are updated to add the most recent data, and the learning model (44) starts a process that recalibrates the impact parameters (35) using all the most recent data. This includes at least one month of data that was noted during the last recalibration.

The learning model (44) runs the "old" impact parameters through the objective function of the current recalibration to see how well those parameters fit. The learning model (44) compares the objective function value for the new parameters with that from the old parameters to see if there is a significant difference.

The learning model (44) also uses the most recent month of data (i.e., sample points) to see how well the old impact parameters predicted the strategy effectiveness. In other words, the learning model (44) will run the consumer experience evaluation model (32) on each account using what the consumer experienced to see what the learning model (44) estimates the result will be. The estimated results can be compared with what actually happened to see how well the learning model (44) is working. The learning model (44) also highlights the differences between the parameters.

The model (10) also learns in another way that is outside the learning model (44). As a consumer changes, his or her strategy response changes and the model (10) automatically adjusts the specific collection strategy that is used on the consumer. As the whole credit card portfolio changes, consumers will move between SRCs (34) and the distribution of specific collection strategies that are used may change.

For example, if the portfolio is suddenly full of low risk accounts, the model (10) might decide that it is more cost effective not to use the collector agent resources than to waste them on low risk accounts. Without a system that could learn in this way, it is likely that the collectors would continue to be used (and wasted) on low risk accounts.

The consumer experience evaluation model (32) will estimate the P{MMP} and E[%FDA] resulting from what the consumer experiences as a "strategy" from the user. In order for the model (10) to recommend strategies, however these metries must be converted into estimates of how a consumer will respond to a specific collection strategy.

As discussed earlier the strategy converter (26) determines the distribution of consumer experiences for each specific collection strategy (30). The converter (26) produces such a distribution for each delinquent consumer (30), since each has different connect and contact probabilities (24). For each consumer, the model (10) then takes this distribution and computes the P{MMP} and E[%FDA] for each specific collection strategy, given the P{MMP} and E[%FDA] for each consumer experience. This calculation is a straightforward expected value computation (46).

As an example. suppose that specific collection strategy #1 can only result in three different consumer experiences (14) for a certain consumer. The strategy converter (26) determines that the consumer will have consumer experience #1 with probability 0.1, consumer experience #2 with probability 0.3, and consumer experience #3 with probability 0.6. The consumer experience evaluation model 32 determines that the consumer has P{MMP}=0.76 with consumer experience #1, P{MMP}=0.61 with consumer experience #2, and, P{MMP}=0.66 with consumer experience #3. The expected value (46) for P{MMP} of specific collection strategy #1 is:

$$0.1*0.76+0.3*0.61+0.6*0.66=0.655$$

The model performs this calculation for every consumer and every specific collection strategy (20), for both P{MMP} and E[%FDA]. These figures are fed directly to the resource allocation model (50).

On each cycle day, the resource allocation model (50) automatically determines which specific collection strategy (12) should be applied to each account that is cycling that day. The resource allocation model (50) automatically chooses the "best" specific collection strategy for each account to maximize user benefits (48) subject to any resource constraints (42).

The objective of the model (10) is to maximize the value of all the collection strategies that are applied to delinquent accounts. The value of all strategies is simply the sum of the values of each individual strategy. A simple way to determine the value of a strategy is to take the expected amount collected as a result of applying the strategy and subtract the cost of the strategy. This simple formula, however does not take into account the change in consumer value as a result of applying the strategy. The term "Credit cardholder value" means a measure of the potential income (or loss) the account may generate. For example, if the minimum monthly payment is not received from an account during the month, then the account will cycle to the next delinquency level and accounts in later cycles are less profitable than accounts in earlier cycles. To be more complete the model (10) needs to include the negative impact of not receiving the minimum monthly payment from an account. In addition to considering this negative rolling the model (10) also needs to consider the potential negative impact on card use if the strategy annoys a potentially profitable consumer who then decides to stop using the card.

The expected consumer value can be calculated after implementing the collection strategy as follows:

E[Credit cardholder value after strategy]=P{MMP}*(value of consumer at current delinquency cycle given a payment just made)+(1−P{MMP})*(value of consumer at next delinquency cycle given just cycled)−penalty for intense strategies at current delinquency cycle.

The user must determine the value of a consumer at all delinquency cycles for both the case when the account just cycled and the case when a minimum monthly payment was just made. The user must also determine the penalty for intense strategies at each delinquency cycle. As described above, the model will compute P{MMP}, the probability of receiving the minimum monthly payment. The full objective function the model resource allocation model (50) uses is:

maximize Σ E[amount collected]−E[cost of implementing the strategy]+E[consumer value after strategy]

The model (10) computes each of these factors from the data provided.

The resource allocation model (50) must attempt to find the maximum of the above objective function subject to the constraints that exactly one strategy must be assigned to each account and that the model (50) cannot use more collector resources than there are available. The model (50) assumes, for example, that there are two types of collector resources constraints (42): one for regular hours and one for overtime hours. Because collectors are assigned to specific units, the resource allocation model (50) has two collector constraints (42) for each unit. The model (50) includes additional constraints (42) to allow some collectors to work in multiple units.

Although the resource allocation problem is fairly simple in terms of its formulation, the vast number of accounts that must be assigned a strategy makes finding the solution to this problem non-trivial. The model (10) automatically solves the resource allocation problem on one day for all delinquent accounts that cycle that day. As a result the model only has a fraction of the collector resource available: the fraction that has not already been assigned to accounts that cycle on other days. If the model (10) does not allow the fraction of collector resources that is assigned to each cycle group to change, the solution over all cycle days will be less than optimal. In order to deal with this problem, the resource allocation model (50) uses a resource balancing module.

The resource balancing module reassigns collector resources among the different cycle days. As a first step, it determines the value of having one more unit or one less unit of resource available for each cycle day group. Using these values it computes an optimal or near-optimal distribution of resources among the cycles days. When the resource allocation model is run for one cycle day, the collector resources that are available are fed from the resource balancing module and could be more or less than what is truly leftover form the all the other cycles. While the distribution of collector resources may change initially, it should settle down quickly into a stable pattern. When the model (10) is first implemented, an initial resource allocation model (50) can be run with all accounts to get an initial solution on how collector resources should be divided among the cycle days.

The strategy converter (26) can be validated by comparing actual consumer experiences to the predictions made by the converter (26). The actual experiences of consumers who had similar contact and connect probabilities (24) and who had the same strategy assigned to them may be combined in order to increase the number of data points. Because the model (10) will use specific collection strategies that are not currently used, the strategy converter (26) validation may have to wait until the model (10) has been in operation for a month or two.

In order to validate the consumer experience evaluation model (32), the actual amounts collected from each account and whether the minimum monthly payment was made or not can be compared with the predictions made by the consumer experience evaluation model (32). This validation can be accomplished before the model has been implemented, provided historical data is available on how consumers responded to different consumer experiences.

When an account cycles, the model (10) evaluates the account and determines what specific collection strategy is "best" for that account. The model (10) assigns the specific collection strategy at the beginning of the cycle and that same strategy is used throughout the cycle (unless the account goes current).

Each day, the user receives a download that contains information on all the delinquent accounts. That download starts the process that eventually leads to the model (10). The first step in the process is to run a process that calculates connect probabilities and contact probabilities (24) for all accounts that are cycling that day. These probabilities are loaded into a database where the model (10) will read them.

Once the probabilities are loaded, the model (10) runs as described. The model (10) determines that "best" specific collection strategy for each account (54) that is cycling that day and loads that information into a cardholder file in a database. The model (10) also loads the objective function of each delinquent account into the cardholder file of the database so that the accounts that are called each day are prioritized (52).

When the model (10) is finished, it starts the specific collection batch strategies. The specific collection batch strategies look at the specific collection strategy that has been assigned to each account as well as what has happened to the account recently and determines the next work date, whether a letter should be sent, whether the account should be outsourced, etc. The specific collection strategies are implemented the next day.

The implementation of the specific collection strategy lags by one day, and that causes a few issues that need to be resolved. For example, if an account is workdated for today and the consumer is contacted, the consumer should not be called tomorrow. If a real-time specific collection strategy to set the workdate out at least 2 days, the specific collection batch strategy will still set the workdate for today, since it does not know about the contact.

At the end of each month the model (10) will run two additional processes. First, the consumer experience (14) database will be updated to include the most recent month of data. Second, the learning model (44) will use the new consumer experience (14) database to recalibrate the impact parameters (35). It will provide the user with information on the new and old impact parameters, and the user will decide whether or not to use the new parameters.

Although some of the description has been couched in terms of credit cardholder or credit card member, it will be appreciated by those of ordinary skill that the terms "credit cardholder or credit card member" are not limited to credit card accounts, but includes account holders for any form of consumer debt such as bank loans and mortgages and the like.

We claim:

1. An automated method using a computer for determining a collection strategy for collecting payments from a delinquent consumer for debts owed by said consumers based on a credit card debt or consumer debt comprising the steps of:

identifying a specific population of said consumers;

automatically defining at least one strategy response category, for each billing cycle of said delinquent consumer's account, which groups said consumer by similar response characteristics;

defining at least one characteristic for grouped consumers which causes them to have similar response characteristic; and assigning individual consumers from said specific population to the at least one strategy response category based on a nexus between the characteristic and the individual consumers.

2. The method of claim 1 further including the step of identifying at least one collection strategy, the assigning step including the step of estimating said consumer's response to the at least one collection strategy.

3. The method of claim 2 further including the steps of identifying collection resources and the costs associated therewith and providing a collection strategy to use with said consumer to optimize the use of the collection resources.

4. The method of claim 3 wherein the providing step includes the step of computing an expected value based on consideration of a distribution of said consumer's experiences for each of a plurality of collection strategies and consumer experience effectiveness.

5. The method of claim 2 wherein the characteristic includes a predetermined response to the at least one collection strategy, individual consumers whose estimated response is similar to the predetermined response being assigned to the at least one response category.

6. The method of claim 5 wherein the estimated response is determined in part by consideration of historical data of said consumer.

7. The method of claim 1 further including the step of defining at least one response predictor in order to predict whether or not said consumer will make a payment to said consumer's account.

8. The method of claim 7 including the step of selecting said response predictor based upon:

a) averaging the number of telephone contacts made to said consumer from the party attempting to collect said payment;

b) averaging the number of phone contacts mailings and left messages to said consumer from said party attempting to collect said payment;

c) calculating the current amount due on said account;

d) computing a current behavior score;

e) calculating the delinquency cycle;

f) calculating the strategy window;

g) computing the change in said behavior score since the start of said delinquency cycle;

h) calculating the current delinquency cycle at the beginning of said strategy window;

i) calculating the number of times said consumer has gone through a delinquency cycle within the past two years;

j) calculating the number of days since the last telephone contact in said current delinquency cycle or calculating the number of days since start of delinquency incident;

k) calculating the number of days since most recent payment;

l) calculating the number of previous delinquent in said account;

m) calculating the number of non-sufficient fund payments in said delinquency incident;

n) calculating the number of promises made by said consumer to make a payments on said account within the past 12 months;

o) calculating the number of previous delinquencies;

p) calculating the maximum delinquency cycle reached in previous delinquency incident; and q) calculating the current utilization line.

9. An automated method using a computer for determining a collection strategy for collecting payments from delinquent consumers, the method comprising the steps of:

automatically defining a collection strategy for each billing cycle of said delinquent consumer's account. which groups said consumer by similar response characteristics, estimating for each consumer of a group, the consumer's response to the collection strategy; and categorizing the consumer based on their estimated response to the collection strategy.

10. The method of claim 9 further including the step of defining a response category in terms of one of collectibility and estimated response by said consumer to said collection strategy and assigning consumers of the group to the response category based on similar estimated responses by similar consumers.

11. The method of claim 10 wherein the estimated response by a consumer is based on a consideration of at least one of the consumer's payment history last payment date and response to previous collection strategies.

12. The method of claim 9 further including the step of defining at least one response predictor in order to predict whether or not said consumer will make a payment to said account.

13. The method of claim 12 including the step of selecting said response predictor based upon:

a) averaging the number of telephone contacts made to said consumer from the party attempting to collect said payment;

b) averaging the number of phone contacts, mailings and left messages to said consumer from said party attempting to collect said credit card payment;
c) calculating the current amount due on said account;
d) computing a current behavior score;
e) calculating the delinquency cycle;
f) calculating the strategy window;
g) computing the change in said behavior score since the start of said delinquency cycle;
h) calculating the current delinquency cycle at the beginning of said strategy window;
i) calculating the number of times said consumer has gone through a delinquency cycle within the past two years;
j) calculating the number of days since the last telephone contact in said current delinquency cycle or calculating the number of days since start of delinquency incident;
k) calculating the number of days since most recent payment;
l) calculating the number of previous delinquent in said credit card account;
m) calculating the number of non-sufficient fund payments in said delinquency incident;
n) calculating the number of promises made by said consumer to make a payments on said credit card account within the past 12 months;
o) calculating the number of previous delinquencies;
p) calculating the maximum delinquency cycle reached in previous delinquency incident; and
q) calculating the current utilization line.

14. A computerized system for recommending collection strategies to use on delinquent accounts the system comprising:
a computer; and
a computer program, the computer program being executable on the processing unit and adapted to accept and process historical collection data, automatically estimating possible consumer responses to various collection strategies, which automatically groups said consumer by similar response characteristics; and recommending a collection strategy based on said estimated responses.

15. The system of claim 14 wherein the computer program is further adapted to consider previous consumer experiences and estimate the effectiveness of a collection strategy in view of said previous consumer experiences.

16. The system of claim 14 wherein the historical data includes information related to at least one of a consumer's response to past collection efforts, the consumer's payment history, and the consumer's last payment date.

17. The system of claim 16 wherein the computer program is further adapted to recommend a collection strategy based on collector resources available and cost associated therewith.

18. The method of claim 14 further including the step of defining at least one response predictor in order to predict whether or not said consumer will make a payment to said credit card.

19. The method of claim 18 including the step of selecting said response predictor based upon:
a) averaging the number of telephone contacts made to said consumer from the party attempting to collect said payment;
b) averaging the number of phone contacts, mailings and left messages to said consumer from said party attempting to collect said credit card payment;
c) calculating the current amount due on said account;
d) computing a current behavior score;
e) calculating the delinquency cycle;
f) calculating the strategy window;
g) computing the change in said behavior score since the start of said delinquency cycle;
h) calculating the current delinquency cycle at the beginning of said strategy window;
i) calculating the number of times said consumer has gone through a delinquency cycle within the past two years;
j) calculating the number of days since the last telephone contact in said current delinquency cycle or calculating the number of days since start of delinquency incident;
k) calculating the number of days since most recent payment;
l) calculating the number of previous delinquent in said account;
m) calculating the number of non-sufficient fund payments in said delinquency incident;
n) calculating the number of promises made by said consumer to make a payments on said account within the past 12 months;
o) calculating the number of previous delinquencies;
p) calculating the maximum delinquency cycle reached in previous delinquency incident; and
q) calculating the current utilization line.

20. An automated method using a computer to optimize utilization of collection resources comprising the steps of:
providing a plurality of specific collection strategies;
automatically defining at least one strategy response category, for each billing cycle of said delinquent consumer's account, which groups said consumer by similar response characteristics;
providing historical data related to a consumer's prior responses to said collection strategies used on said consumer;
estimating said consumer's response to each of the plurality of collection strategies in view of said historical data;
estimating the cost associated with using each of the plurality of collection strategies on said consumer; and
determining a collection strategy to use on said consumer that optimizes the utilization of collection resources based at least in part on the estimated cost.

21. The method of claim 20 further including the step of defining at least one response predictor in order to predict whether or not said consumer will make a payment to said consumer's account.

22. The method of claim 21 including the step of selecting said response predictor based upon:
a) averaging the number of telephone contacts made to said consumer from the party attempting to collect said payment;
b) averaging the number of phone contacts, mailings and left messages to said consumer from said party attempting to collect said credit card payment;
c) calculating the current amount due on said credit card account;
d) computing a current behavior score;
e) calculating the delinquency cycle;
f) calculating the strategy window;
g) computing the change in said behavior score since the start of said delinquency cycle;

h) calculating the current delinquency cycle at the beginning of said strategy window;

i) calculating the number of times said consumer has gone through a delinquency cycle within the past two years;

j) calculating the number of days since the last telephone contact in said current delinquency cycle or calculating the number of days since start of delinquency incident;

k) calculating the number of days since most recent payment;

l) calculating the number of previous delinquent in said account;

m) calculating the number of non-sufficient fund payments in said delinquency incident;

n) calculating the number of promises made by said consumer to make a payments on said credit card account within the past 12 months, o) calculating the number of previous delinquencies;

p) calculating the maximum delinquency cycle reached in previous delinquency incident; and q) calculating the current utilization line.

23. An automated method using a computer for determining recommended strategies to be used on delinquent accounts comprising the steps of:

defining a collection strategy;

automatically defining at least one strategy response category, for each billing cycle of said delinquent consumer's account, which groups said consumer by similar response characteristics;

determining a relationship between said defined collection strategy and said consumer's experience;

estimating a payment amount responsive to said consumer's experience;

estimating the amount of resources expended during the collection strategy; and determining a collection strategy for each account that maximizes the available collection resources in view of the estimated payment.

24. The method of claim 23 further including the step of defining, at least one response predictor in order to predict whether or not said consumer will make a payment to said credit card.

25. The method of claim 24 including the step of selecting said response predictor based upon:

a) averaging the number of telephone contacts made to said consumer from the party attempting to collect said payment;

b) averaging the number of phone contacts, mailings and left messages to said consumer from the party attempting to collect said credit card payment;

c) calculating the current amount due on said account;

d) computing a current behavior score;

e) calculating the delinquency cycle;

f) calculating the strategy window;

g) computing the change in said behavior score since the start of said delinquency cycle;

h) calculating the current delinquency cycle at the beginning of said strategy window;

i) calculating the number of times said consumer has gone through a delinquency cycle within the past two years;

j) calculating the number of days since the last telephone contact in said current delinquency cycle or calculating the number of days since start of delinquency incident;

k) calculating the number of days since most recent payment;

l) calculating the number of previous delinquent in said account;

m) calculating the number of non-sufficient fund payments in said delinquency incident;

n) calculating the number of promises made by said consumer to make a payments on said account within the past 12 months;

o) calculating the number of previous delinquencies;

p) calculating the maximum delinquency cycle reached in previous delinquency incident; and q) calculating the current utilization line.

* * * * *